(12) United States Patent
Lee et al.

(10) Patent No.: US 7,839,939 B2
(45) Date of Patent: Nov. 23, 2010

(54) METHOD OF TRANSMITTING INFORMATION WITH THE HELP OF CHAOTIC SIGNALS

(75) Inventors: Seong-soo Lee, Suwon-si (KR); Young-hwan Kim, Hwaseong-gun (KR); Alexander S. Dmitriev, Moscow (RU)

(73) Assignees: Samsung Electronics Co., Ltd., Suwon-si (KR); Institute of Radio Engineering and Electronics of RAS, Moscow (RU)

( * ) Notice: Subject to any disclaimer, the term of this patent is extended or adjusted under 35 U.S.C. 154(b) by 678 days.

(21) Appl. No.: 10/996,048

(22) Filed: Nov. 24, 2004

(65) Prior Publication Data

US 2005/0129413 A1 Jun. 16, 2005

(30) Foreign Application Priority Data

Nov. 26, 2003 (RU) .............................. 2003134263

(51) Int. Cl.
*H04L 27/00* (2006.01)
*H04B 1/707* (2006.01)

(52) U.S. Cl. .................... 375/259; 375/140; 375/146

(58) Field of Classification Search .................. 375/259, 375/295–296, 316, 341, 130, 132, 135, 140, 375/146, 254, 271, 284–285; 380/18, 23, 380/46, 263, 252; 702/57
See application file for complete search history.

(56) References Cited

U.S. PATENT DOCUMENTS 5,291,555 A * 3/1994 Cuomo et al. ............... 380/263
5,680,462 A * 10/1997 Miller et al. ................ 380/263

(Continued)

FOREIGN PATENT DOCUMENTS

RU 2185032 10/2002

(Continued)

OTHER PUBLICATIONS

Fortuna et al., Chaotic Pulse Position Modulation to Improve the Efficiency of Sonar Sensors, Dec. 2003, IEEE Transactions on Instrumentation and Measurement, vol. 52, Issue 6, pp. 1809-1814.*

(Continued)

*Primary Examiner*—Tesfaldet Bocure
*Assistant Examiner*—Lawrence B Williams
(74) *Attorney, Agent, or Firm*—Sughrue Mion, PLLC

(57) ABSTRACT

Spread spectrum transmission of information is performed using chaotic signals. Direct chaotic communication systems in which information is input to chaotic signal generated directly in information transmission frequency band, are achieved by forming broadband information carrier necessary for transmission and using a chaotic dynamic system whose structure is synthesized in advance in accordance with predetermined characteristics of broadband information carrier to cause chaotic dynamic system to provide operation of forming the broadband information carrier in form of a chaotic information carrier having prescribed spectral characteristics. Modulating the chaotic information carrier is carried out by forming chaotic radio or optic chaotic pulses from chaotic information carrier, with predetermined time intervals between pulses in accordance with the transmitted information signal, and the reception and demodulation at the receiving side is carried out using a dynamic system matched, in behavior, with chaotic dynamic system of transmitting side.

12 Claims, 31 Drawing Sheets

U.S. PATENT DOCUMENTS

| | | | | |
|---|---|---|---|---|
| 5,923,760 | A * | 7/1999 | Abarbanel et al. | 380/34 |
| 6,064,701 | A * | 5/2000 | Tresser et al. | 375/285 |
| 6,178,217 | B1 * | 1/2001 | Defries et al. | 375/377 |
| 6,216,093 | B1 * | 4/2001 | Corron et al. | 702/57 |
| 6,310,906 | B1 * | 10/2001 | Abarbanel et al. | 375/130 |
| 6,331,974 | B1 * | 12/2001 | Yang et al. | 375/140 |
| 6,882,689 | B2 * | 4/2005 | Maggio et al. | 375/259 |
| 6,892,940 | B2 * | 5/2005 | Kocarev et al. | 235/380 |
| 6,999,445 | B1 * | 2/2006 | Dmitriev et al. | 375/130 |
| 7,072,469 | B1 * | 7/2006 | Oudaltsov et al. | 380/46 |
| 2001/0024476 | A1 * | 9/2001 | Bernardo et al. | 375/295 |
| 2002/0154677 | A1 * | 10/2002 | Occhipinti et al. | 375/130 |

FOREIGN PATENT DOCUMENTS

WO    WO 00/74331 A1    12/2000

OTHER PUBLICATIONS

Fortuna et al., Chaos Preservation Through Continuous Chaotic Pulse Position Modulation, May 6-9, 2001, IEEE International Symposium on Circuits and Systems, vol. 3, pp. 803-806.*

Dmitriev A.S., Panas A.I., Sarkov S.O., Experiments on RF Band Communications Using Chaos, Int. J. Bif. and Chaos, 1997, v.7, N. 11, p. 2511-2527.

A.S.Dmitriev, V.Ya.Kislov. Stochastic oscillations in oscillator with inertial first-order time delay, Radiotekhnika I Elektronika, 1984, v. 29, # 12, p. 2389.

* cited by examiner

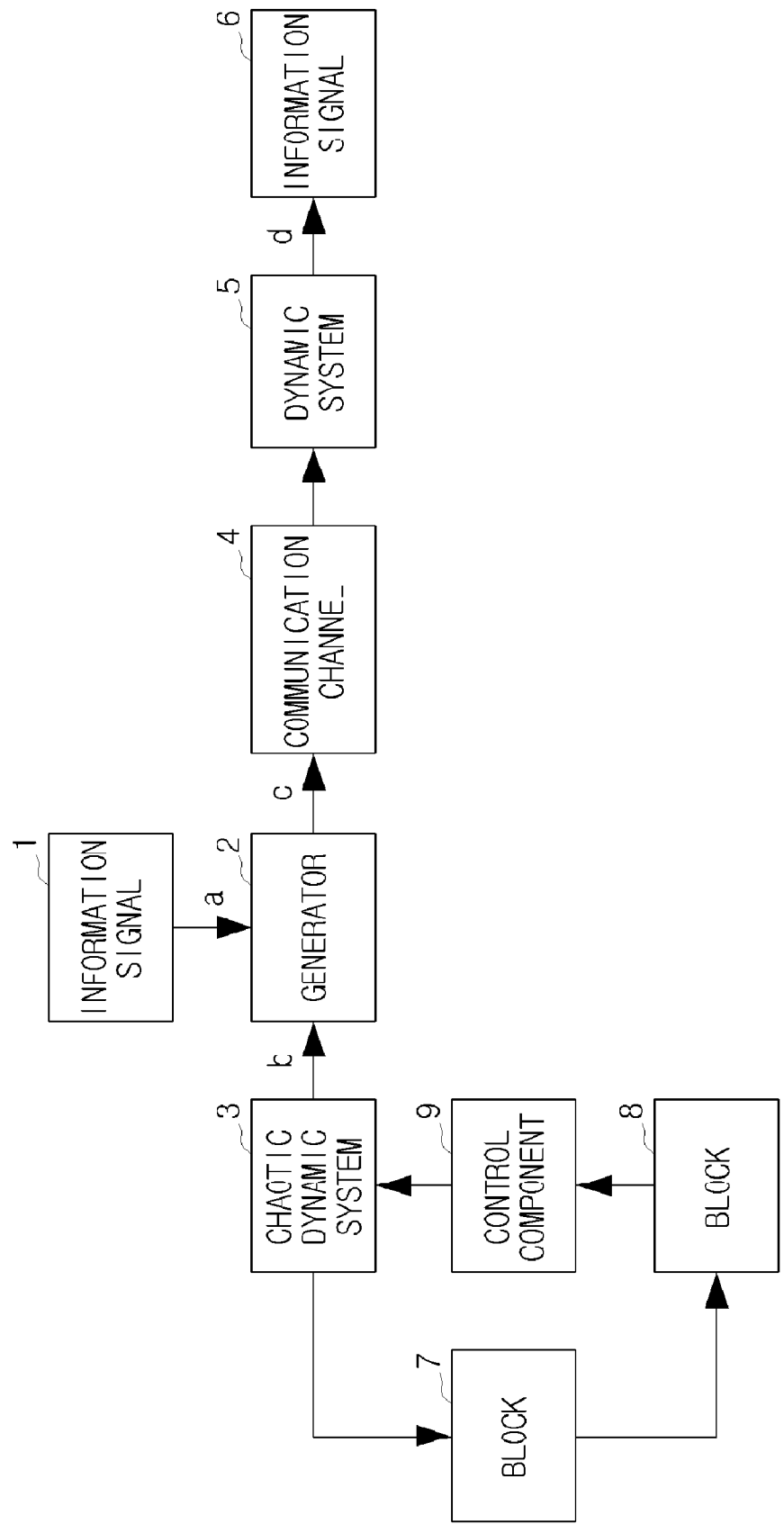

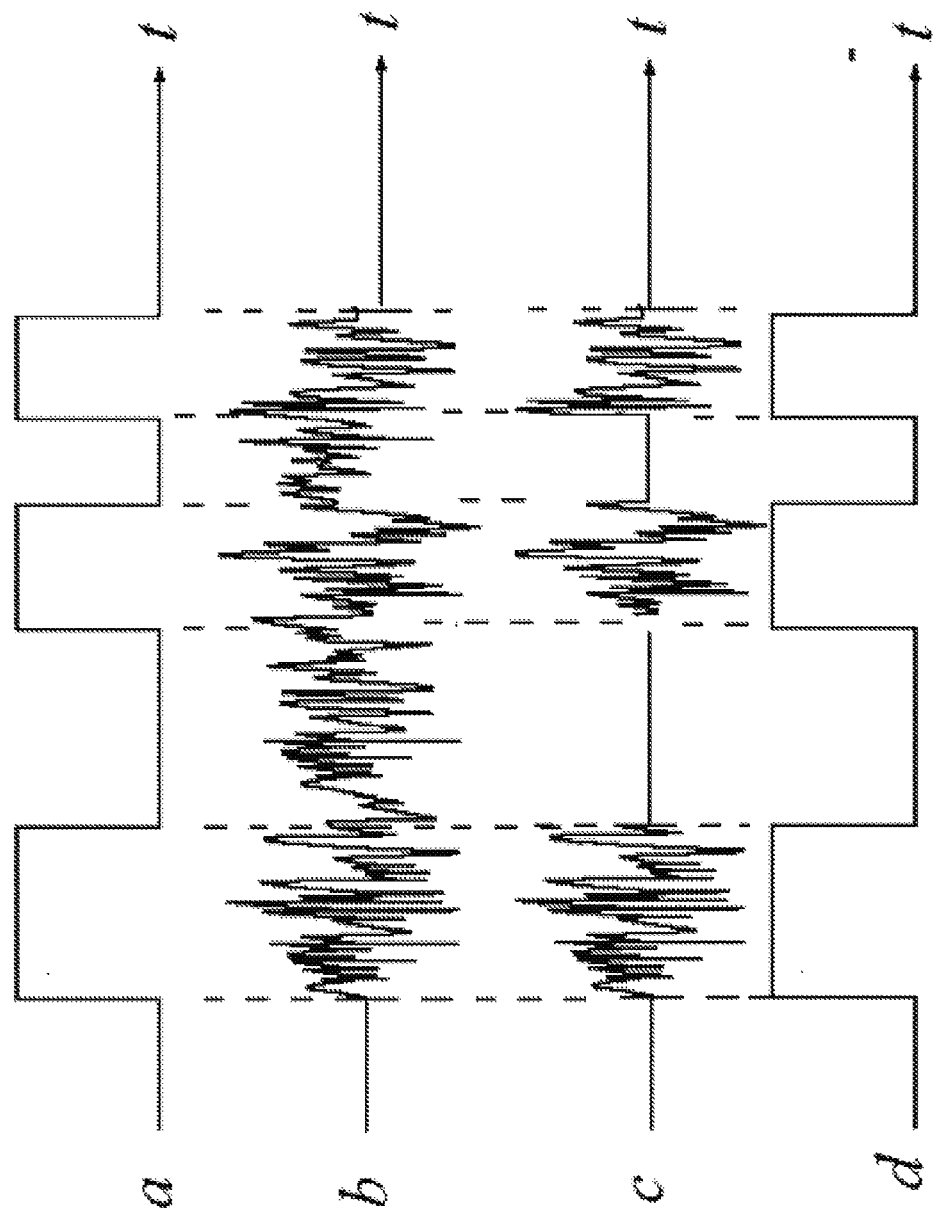

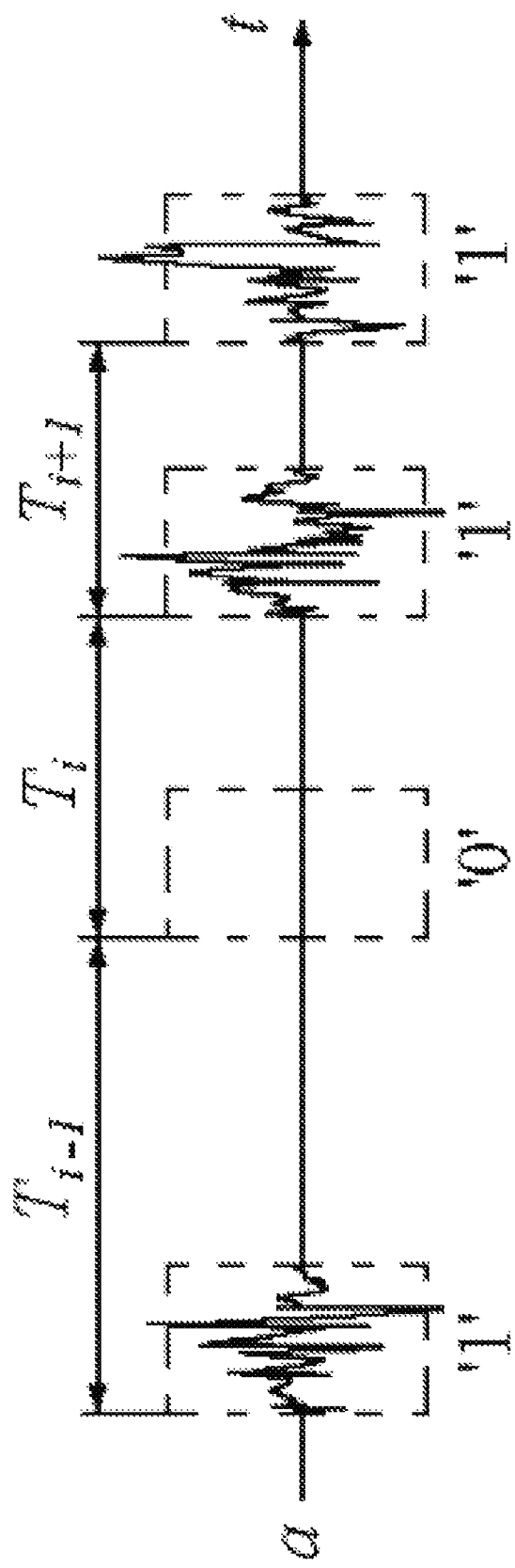

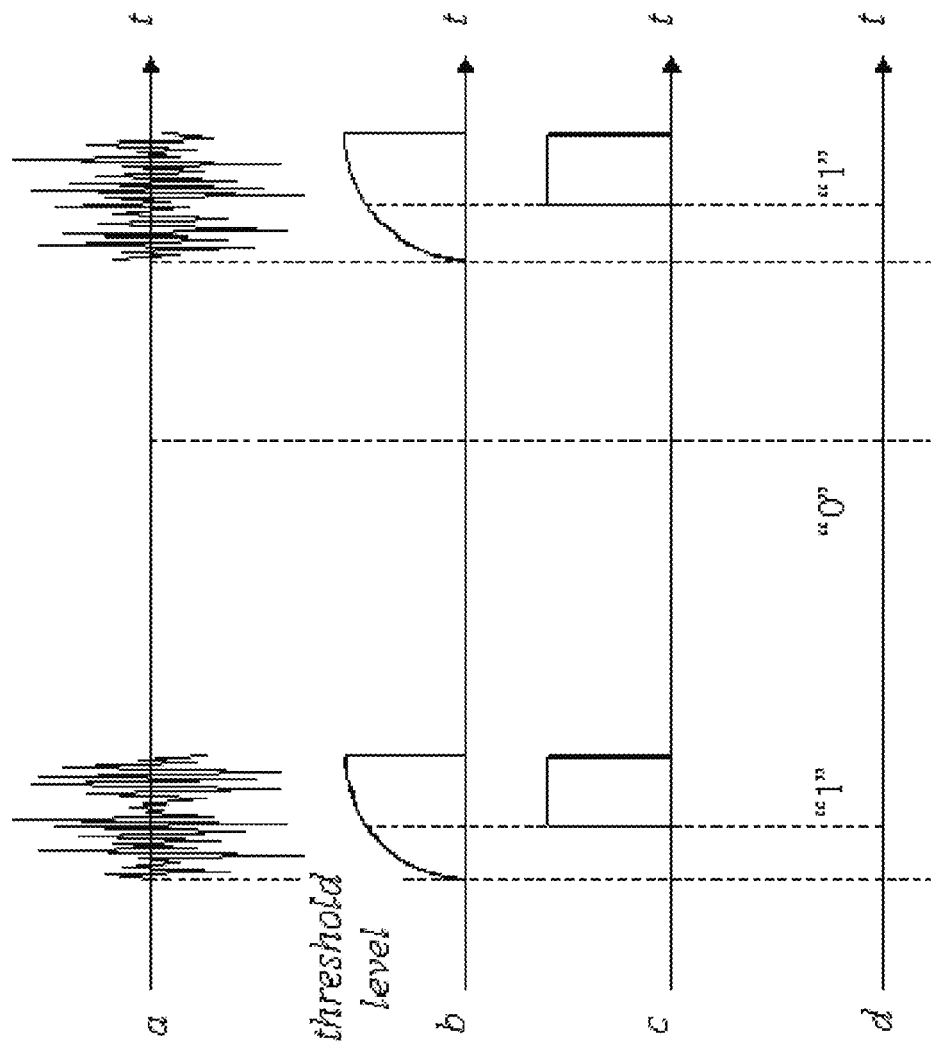

FIG. 16
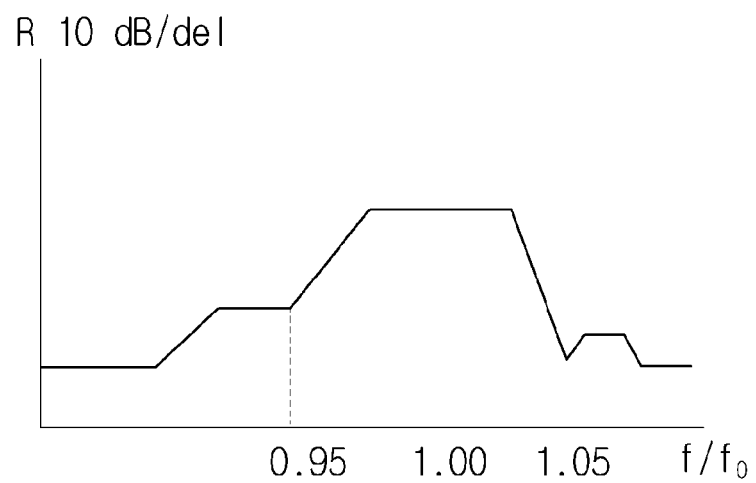
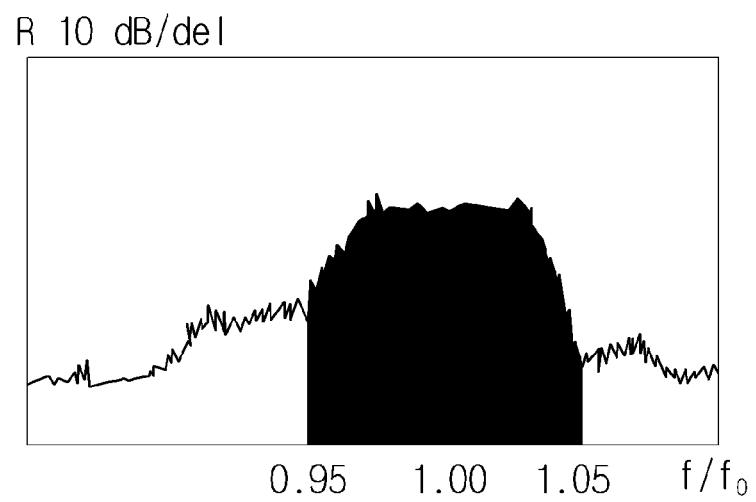
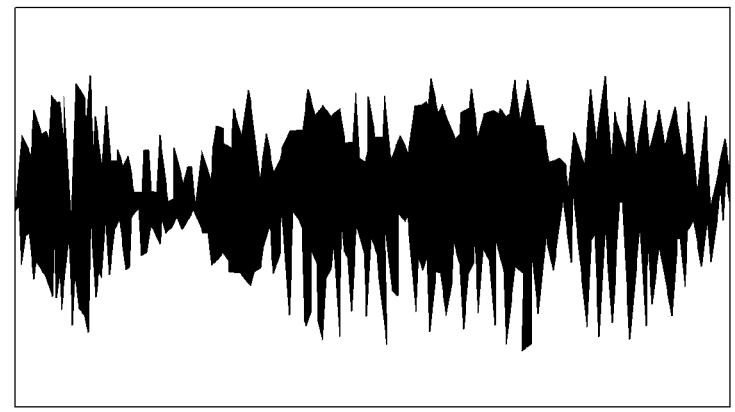

FIG. 17
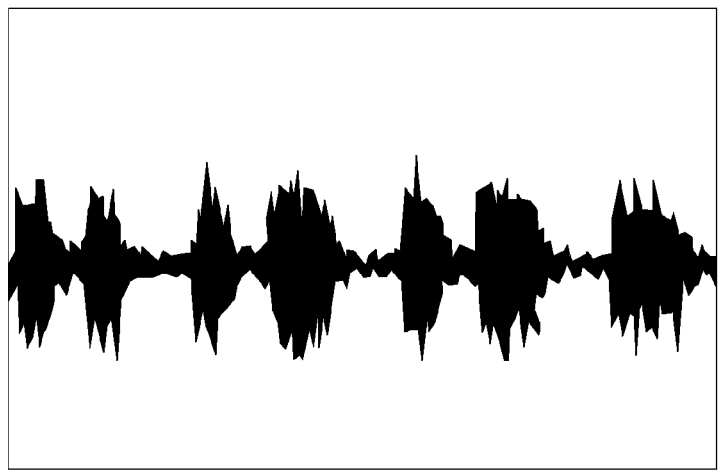
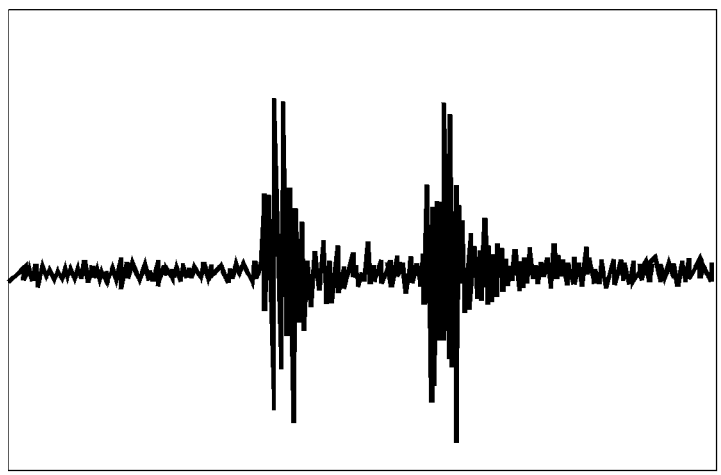
R 10 dB/del
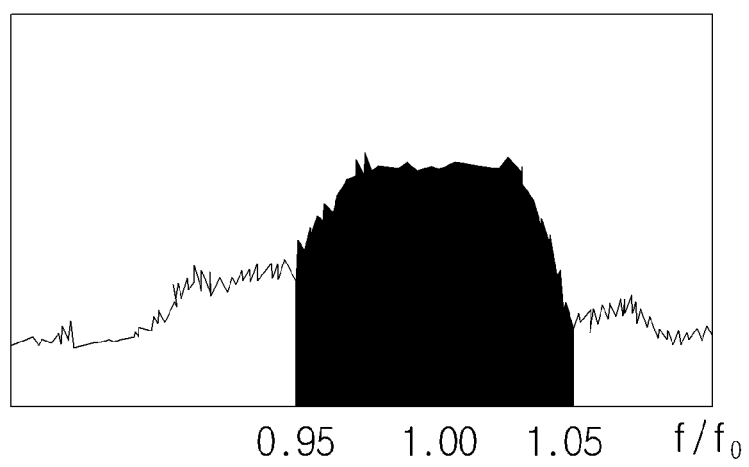
0.95  1.00  1.05  $f/f_0$

METHOD OF TRANSMITTING INFORMATION WITH THE HELP OF CHAOTIC SIGNALS

This application claims benefit of Russian Patent Application No. 2003134263 filed Nov. 26, 2003, in the Russian Patent Office, the disclosure of which is incorporated herein by reference.

BACKGROUND OF INVENTION

1. Field of the Invention

The present invention relates to a field of the chaotic signal-aided spread-spectrum communications.

The present invention relates to the field of the spread spectrum transmission of information, which is performed by chaotic signals. In particular, the present invention relates to the method for direct chaotic communications with pre-determined spectral mask.

2. Description of the Related Art

At present, it is known that chaotic signals generated by non-linear deterministic dynamic systems, the so-called dynamic chaos, possess a number of properties that make such signals suitable for transmission of information. In particular, the promising nature of chaotic signals as carrier or modulating oscillations is shown (A. S. DMITRIEV, A. I. PANAS, S. O. STARKOV. Dynamic chaos as a paradigm for modern telecommunication systems//Uspekhi Sovremennoy Radielektroniki, 1997, #10, p. 4; M. HASLER. Achievements in the field of information transmission with the use of chaos// Uspekhi Sovremennoy Radielektroniki, 1998, #11, p. 33). Certain information transmission circuits using the dynamic chaos are proposed, in particular, a circuit of information signal chaotic masking (L. KOCAREV, K. S. HALLE, K. ECKERT, L. CHUA, U. PARLITZ. Experimental demonstration of secure communications via chaotic synchronization// Int. J. Bifurcation and Chaos, 1992, v. 2, #3, p. 709), a circuit with chaotic modes switching [H. DEDIEU, M, KENNEDY, M. HASLER. Chaos shift keying: Modulation and demodulation of a chaotic carrier using self-synchronizing Chua's circuits//IEEE Trans. Circuits and Systems, October 1993, v. CAS-40, #10, p. 634], circuits with non-linear mixture of information signal to chaotic signal (A. R. VOLKOVSKI, N. V. RULKOV. Synchronous chaotic response of non-linear system used to transmit information with a chaotic carrier// Letters to Zhurn. Techn. Fiz., 1993, v. 19, #3, p. 71; A. DMITRIEV, A. PANAS, S. STARKOV. Experiments on speech and music signals transmission using chaos//Int. Journal of Bifurcation and Chaos, 1995, v. 5, p. 371) etc. Under consideration are possibilities of generating direct chaotic communication systems with chaotic oscillations serving as an information carrier generated within the frequency band where transmission of information takes place, for example, in microwaves (A. S. DMITRIEV, B. E. KYARGINSKI, N. A. MAKSIMOV, A. I. PANAS, S. O. STARKOV. Prospects of creating direct chaotic communication systems in RF and microwave bands//Radiotekhnika, 2000, #3, p. 9).

There are two varieties of methods for spread-spectrum communications. The first uses a narrow-band periodic carrier of information, e.g., code-division multiple-access system (CDMA), as well as the systems with frequency modulation, where the frequency band of the transmitted information is essentially narrower than the frequency band of the carrier signal. The other variety of the methods for spread-spectrum communications uses a principally wide-band carrier, whose frequency band is wider than the frequency band of the transmitted information (U.S. Pat. No. 16,097, H04K 1/00, Mar. 18, 1960). Frequency-hopping spread-spectrum systems should also be referred to this variety (J. PROAKIS. Digital Communication, McGraw-Hill, Inc., New-York, 1995, p. 741).

The closest to the method described in the present invention is the frequency-hopping spread-spectrum communication method. Under this method, the transmitting side generates a wide-band information carrier within a preset information transmission frequency band; the carrier is modulated by means of information signal; the modulated signal is transmitted via a communication channel from the transmitting side to the receiving side that demodulates the received information carrier to retrieve the information signal (see the above mentioned monograph of J. PROAKIS).

As distinct from this, in the present invention a wide-band information carrier is generated with the help of a chaotic dynamic system that generates chaotic signals directly within the entire frequency band of information transmission (e.g., within a microwave band). In order to use the above signals as a wide-band carrier, it is necessary to solve the problem of generating chaotic oscillations within the required frequency band of electromagnetic spectrum, as well as to elaborate effective methods for information input into the chaotic signal on the transmitting side and for extracting it out of the said signal on the receiving side. By present, only directions of developing the systems based on such a principle have been outlined, yet not their particular microwave implementations (see the above mentioned article by A. S. DMITRIEV in Radiotekhnika Magazine).

At present it is known that chaotic signals generated by nonlinear deterministic dynamic systems (the so-called dynamic chaos) possess a number of features that stimulate application of such signals in communications:

possibility of obtaining complex oscillations in simple-structure devices;

possibility of obtaining many different chaotic modes in a single device;

possibility of effective control of chaotic modes by means of small variation of system parameters;

large information capacity;

capability of self-synchronization of transmitter and receiver;

alternative methods of multiplexing; and confidentiality of information transmission.

In particular, promising is shown the use of chaotic signals generated by the so-called chaotic dynamic systems as carrier or modulated oscillations (Dmitriev, A. S. et al., "Dynamic chaos as paradigm for contemporary communication systems," *Uspekhi sovremennoi radioelektroniki*, 1997, No. 10, p. 4; Hasler, M., "Advances of communications using chaos", *Uspekhi sovremennoi radioelektroniki*, 1998, No. 11, p. 33; A. S. Dmitriev, A. I. Panas, Dynamic Chaos. Novel Information Carriers for Communications.—Fizmatlit, Moscow, 2002). A number of concrete schemes for transmission of information using dynamic chaos are proposed, in particular, a scheme with chaotic masking of information signal (L. Kosarev, K. S. Halle, K. Eckert, L. Chua, U. Parlitz, Experimental demonstration of secure communications via chaotic synchronization, Int. J. Bifurcation and Chaos, 1992, v. 2, No. 3, pp. 709-713), a scheme with chaos shift keying (H. Dedieu, M. Kennedy, M. Hasler, Chaos shift keying: Modulation and demodulation of a chaotic carrier using self-synchronizing Chua's circuits, IEEE Trans. Circuits and Systems, October 1993, v. CAS-40, No. 10, pp. 634-642), a scheme with non-linear mixing of information signal to chaotic one (Volkovsky, A. R., Rulkov, N. V., "Synchronous chaotic response of nonlinear information transmission system using chaotic carrier," *Pis 'ma v Zhurn. Tekhn. Fiz.*, 1993, vol. 3, no. 3, pp. 71-75; A. Dmitriev, A. Panas, S. Starkov, Experiments on speech and music signals transmission using chaos, Int. Journal of Bifurcation and Chaos, 1995, v. 5, No. 3, pp. 317-376), etc. Direct chaotic communications scheme is proposed, in which chaotic oscillations play the role of information carrier, said carrier being generated directly in the frequency range used for the transmission of information, e.g., in microwave band (Dmitriev A. S., Kyarginsky B. E., Maksimov N. A., Panas A. I., Starkov S. O., "Prospects of constructing direct chaotic communication systems for RF and microwave bands," *Radiotekhnika*, 2000, No. 3, pp. 9-19).

There are two varieties of methods for spread spectrum transmission of information. The first uses narrowband information carrier. Examples are code-division multiple-access systems, CDMA, that use Direct Sequence Spread Signals; and systems with frequency modulation in which the frequency bandwidth of the transmitted information is essentially less than the bandwidth of the transmitted signal. In the other variety of methods for spread spectrum transmission of information a novel wideband carrier is used, whose frequency bandwidth is greater than the transmitted information bandwidth (U.S. Pat. No. 4,363,130, issued Dec. 7, 1982). Frequency-Hopping Spread Spectrum systems also refer to this variety (J. Proakis, Digital Communication, McGraw Hill, Inc., New York, 1995).

The related art that is most close to the method of this invention is the method for transmission of information using chaotic signals, in which: at the transmitting side of each user an information carrier is formed in at least a part of the predetermined frequency range, wherein said information carrier is formed with a chaotic dynamic system, which structure is synthesized in advance according to predetermined characteristics of said information carrier; in synthesizing said chaotic dynamic system, regions of its parameters are revealed that provide the same type behavior of said chaotic dynamic system; from said revealed parameter regions, values of parameters of said chaotic dynamic system are chosen so as to provide forming of said information carrier in the form of chaotic information carrier with at least predetermined spectral characteristics; said formed information carrier is modulated by corresponding information signal; the modulated chaotic information carrier is transmitted through communication channel to the receiving side; at the receiving side of each user the step of reception and demodulation of received chaotic information carrier is performed using a dynamic system matched in its behavior with said chaotic dynamic system of the transmitting side (Patent of Russian Federation No. 2185032, N 04 K 1/10, Oct. 7, 2002). This method allows effective use of ultrawide band of carrying chaotic signal for organization of high-rate communications channels.

However, this method does not imply any other restrictions on the power spectrum of the signal formed and transmitted through the channel, except its bandwidth. In particular, it doesn't impose restrictions on the spectral density. At the same time, there is a need in methods for communications with restricted power spectral density, e.g., by development of new communications standards.

SUMMARY OF THE INVENTION

Hence, the task of the present invention is the development of a method for information transmission with the use of chaotic signals, a technical result of which consists in implementation of communication systems that input information into the chaotic signal generated directly within the communication band, that are hereinforth referred to as direct chaotic communication systems.

The above task aimed at the aforementioned technical result is solved by a method for transmitting information with the help of chaotic signals that consists in the following: on the transmitting side a wide-band information carrier is generated within a preset band of information transmission frequencies, the said information carrier is modulated by means of an information signal, the modulated information carrier is transmitted via a communication channel from the transmitting side to the receiving side, and the latter demodulates the received information carrier to retrieve the information signal. According to the present invention, the aforementioned generation of the wide-band information carrier takes place with the help of a chaotic dynamic system, the structure of which is synthesized beforehand according to preset characteristics of the aforementioned wide-band information carrier. Said chaotic dynamic system is synthesized with identification of regions of its parameters providing similar behavior of the said chaotic dynamic system. On the basis of said identified parameter regions, selected for said chaotic dynamic system are values of parameters providing the aforementioned wide-band information carrier as a chaotic carrier of information with at least required spectrum characteristics. Said modulation is performed by means of forming, according to the information signal, of chaotic RF or optical pulses of preset duration with preset time intervals between these pulses, which is followed by transmission of the modulated information carrier via communication channel. The aforementioned reception and demodulation on the receiving side is performed with a dynamic system matched in terms of its behavior with said chaotic dynamic system of the transmitting side.

A feature of said method is that as the chaotic dynamic system, a dynamic oscillating system is used with at least one active element and an additional frequency-selective structure for forming a wide-band information carrier.

To do this, the dynamic oscillating system is supplemented with regulating elements for selecting wide-band information carrier generation mode and/or for forming RF or optical pulses and intervals between them, or RF or optical pulses and intervals between them are formed in a supplementary feedback circuit on the transmitting side.

Another feature of said method is that forming chaotic RF or optical pulses having a preset duration and time intervals between them is performed by means of controlling the chaotic dynamic system behavior.

The chaotic dynamic system behavior is controlled by means of controlling its parameters variation or by controlling the trajectory of a depicting point in the phase space of this chaotic dynamic system.

Controlling the trajectory is accomplished either by changing the initial conditions of said chaotic dynamic system or by means of holding the trajectory of the depicting point in the phase space of said chaotic dynamic system within a preset area of said phase space during a preset period of time.

Another feature of this method consists in the fact that the duration of chaotic radio or optical pulses and/or of the intervals between them is formed with the help of chaotic samples generated by a supplementary chaotic dynamic system and the input information subject to be transmitted.

Another feature of this method consists in the fact that reception and demodulation on the receiving side may be performed with the help of a chaotic dynamic system, whose behavior is at least partially synchronized with the chaotic signal of said chaotic dynamic system on the transmitting side.

Eventually, another feature of this method is that both reception and demodulation on the receiving side may be performed with the help of a dynamic system, whose output signal is matched with the signal envelope of the chaotic dynamic system on the receiving side.

The existing state of the art lacks sources of information to describe the totality of distinctive features of this method, which allows to consider it novel.

The existing state of the art lacks sources of information to describe the totality of distinctive features of this method, which allows to consider it having inventive level.

The aim of the present invention is in development of a method for direct chaotic transmission of information between two or several users taking into account restrictions imposed on the power spectral density of signal transmitted through communication channel.

This technical effect is achieved in the method for direct chaotic communications with predetermined spectral mask of carrying signal in which: at the transmitting side an information carrier is formed in at least a part of the predetermined frequency range, wherein said information carrier is formed with a chaotic dynamic system, which structure is synthesized in advance according to predetermined characteristics of said information carrier; in synthesizing said chaotic dynamic system, regions of its parameters are revealed that provide same-type behavior of said chaotic dynamic system; from said revealed parameter regions, values of parameters of said chaotic dynamic system are chosen so as to provide forming said information carrier in the form of chaotic information carrier with at least predetermined spectral characteristics; said formed information carrier is modulated by corresponding information signal; the modulated chaotic information carrier is transmitted through communication channel to the receiving side; at the receiving side the step of reception and demodulation of received chaotic information carrier is performed using a dynamic system matched in its behavior with said chaotic dynamic system of the transmitting side, in accordance with the first exemplary embodiment of the method of the present invention, the step of forming the chaotic information carrier is performed by means of such a structure and parameters of the dynamic system that the formed chaotic information carrier has spectral density matching the predetermined spectral mask in at least a part of the predetermined frequency range; the step of modulation of the formed chaotic information carrier in accordance with the information signal is carried out by means of forming chaotic pulses of predetermined duration with predetermined intervals between said pulses, wherein the pulse duration is chosen so that the spectral density of the modulated chaotic information carrier does not differ substantially from the spectral density of non-modulated chaotic information carrier.

The same technical effect is achieved in accordance with the second exemplary embodiment of the method for the present invention by means of forming the chaotic information carrier simultaneously with its modulation by the information signal by means of choosing such a structure and parameters of the dynamic system that the chaotic information carrier modulated by this information signal has spectral density determined by a predetermined spectral mask in at least a part of the predetermined frequency range.

A distinction of the method according to exemplary embodiments of the present invention is in that at the transmitting side, tags are assigned to the chaotic information carrier, either before modulation or after, that allow its identification as a signal of a specific user destined to at least one other specific user; at the receiving side at the step of receiving chaotic information carriers from communication channel a chaotic information carrier assigned to a specific user is distinguished using said identification tags.

Another distinction of the method according to exemplary embodiments of the present invention is in that an access of each user to the propagation medium of chaotic information carriers is monitored and parameters of transmitted modulated chaotic information carrier are corrected with regard of possibility of access to the propagation medium revealed in the process of monitoring, then this chaotic information carrier is transmitted through the communication channel; at the receiving side, chaotic information carrier is received from the communication channel and demodulated using information about the possibility of access to the propagation medium revealed during the process of monitoring.

Another distinction of the method according to exemplary embodiments of the present invention is in that as a chaotic dynamic system, a dynamic oscillation system with at least one active element and an additional frequency-selective structure is used for forming chaotic information carrier with spectral density conforming with the predetermined spectral mask in at least a part of the predetermined frequency range.

Yet another distinction of the method according to the first exemplary embodiment of the present invention is in that at the step of modulation of chaotic information carrier the pulse duration is chosen such as to provide the predetermined base of modulated chaotic information carrier, which is equal to the product of the pulse duration by the bandwidth of at least a part of the predetermined frequency band.

Finally, the last distinction of the method according to the second exemplary embodiment of the present invention is in that at the transmitting side the step of modulating the chaotic information carrier by information signal is performed by means of multiplying the information signal and the chaotic information carrier, and at the receiving side the step of demodulating the received chaotic information carrier is performed by means of multiplying it with a chaotic information carrier formed at the receiving side using a dynamic system matched by its behavior with the chaotic dynamic system of the transmitting side, after which the product of said multiplication is passed through a filter.

BRIEF DESCRIPTION OF DRAWINGS

The above aspects and features of the present invention will be more apparent by describing certain embodiments of the present invention with reference to the accompanying drawings, in which:

FIGS. 4A and 4B show a general block diagram of information transmission system to implement the method under the present invention and signal profiles in various nodes of the circuit, respectively;

FIGS. 7A and 7B show formation of chaotic radio- and optical pulse stream with the use of a supplementary chaotic dynamic system, respectively;

FIGS. 10A and 10B show a potential circuit for noncoherent reception according to the present invention and the signal profiles in various nodes of the circuit, respectively;

Exemplary embodiments of the present method are illustrated with drawings that are presented for better understanding of the proposed invention. In these drawings similar elements are denoted by the same reference positions.

In FIG. 16 show an example of required form of spectral mask, power spectrum of an original chaotic signal generated according to this mask, and the form of the resulting chaotic oscillations.

In FIG. 17 two fragments of the signal emitted to the channel are shown, differing by chaotic radio pulse durations, along with corresponding power spectra.

DETAILED DESCRIPTION OF EXEMPLARY EMBODIMENTS OF THE INVENTION

Figure 1:
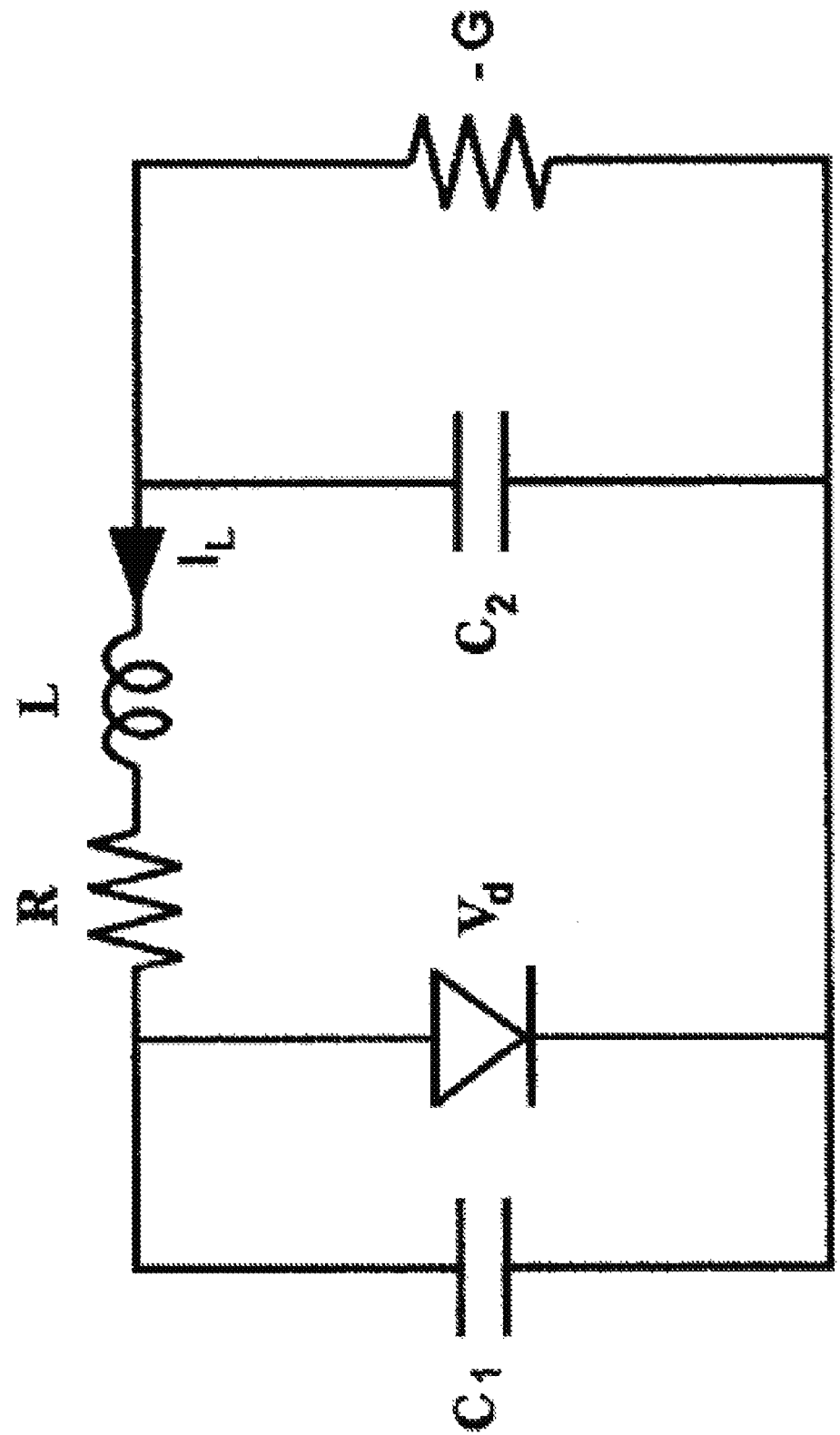
FIG. 1 shows a circuit of chaotic signal generator using a tunnel diode.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Prior to describing potential accomplishments of the present invention, let us consider the features of the underlying dynamic (or deterministic) chaos.

The term 'deterministic chaos' refers to a complicated non-periodic motion produced by non-linear dynamic systems. This motion can occur in the complete absence of external noise and is fully determined by the properties of the deterministic dynamic system itself. Dynamic chaos possesses many features of random processes i.e. continuous power spectrum, exponentially decreasing autocorrelation function, unpredictability for long periods of time.

The behavior of dynamic systems is described with the use of term 'phase space' that depicts a system state as a point, and time evolution of the state as a phase trajectory along which the representative point moves. The systems with deterministic chaos have in their phase space an attracting manifold where the phase trajectories gather into a single channel. This attracting manifold is referred to as a strange attractor.

By present, a great number of dynamic systems capable of generating chaotic signals has been offered and investigated. The simplest dynamic system capable of generating chaos is a discrete-time dynamic system, i.e., the so called logistic map $$x(k+1)=\mu x(k)(1-x(k)). \qquad (1)$$

In a certain range of values of $\mu$, equation (1) generates a non-periodic infinite sequence of samples x(k).

The simplest continuous-time chaotic systems are described by merely three ordinary differential equations and at least a part of them represents generators made by supplementing one or several elements to standard generators of regular oscillations. Other sources of chaos could not be as simply linked with traditional electronic generators, however they can also be accomplished with contemporary components. Typical examples of chaos sources with one and a half degrees of freedom are the following systems:

Tunnel diode generator (A. S. PIKOVSKI, M. I. RABINOVICH. A simple oscillator with stochastic behavior//DAN SSSR, 1978, v. 239, #1-2, p. 301). The generator equations in dimensionless form are as follows:

$$x' = y - \delta z \qquad (2)$$
$$y' = -x + 2\gamma y + \alpha z + \beta'$$
$$\mu z' = x - f(z)$$

where f(z) stands for non-linear response of the tunnel diode; α, β, γ, and δ stand for parameters. The generator circuit is shown in FIG. 1.

Figure 2:
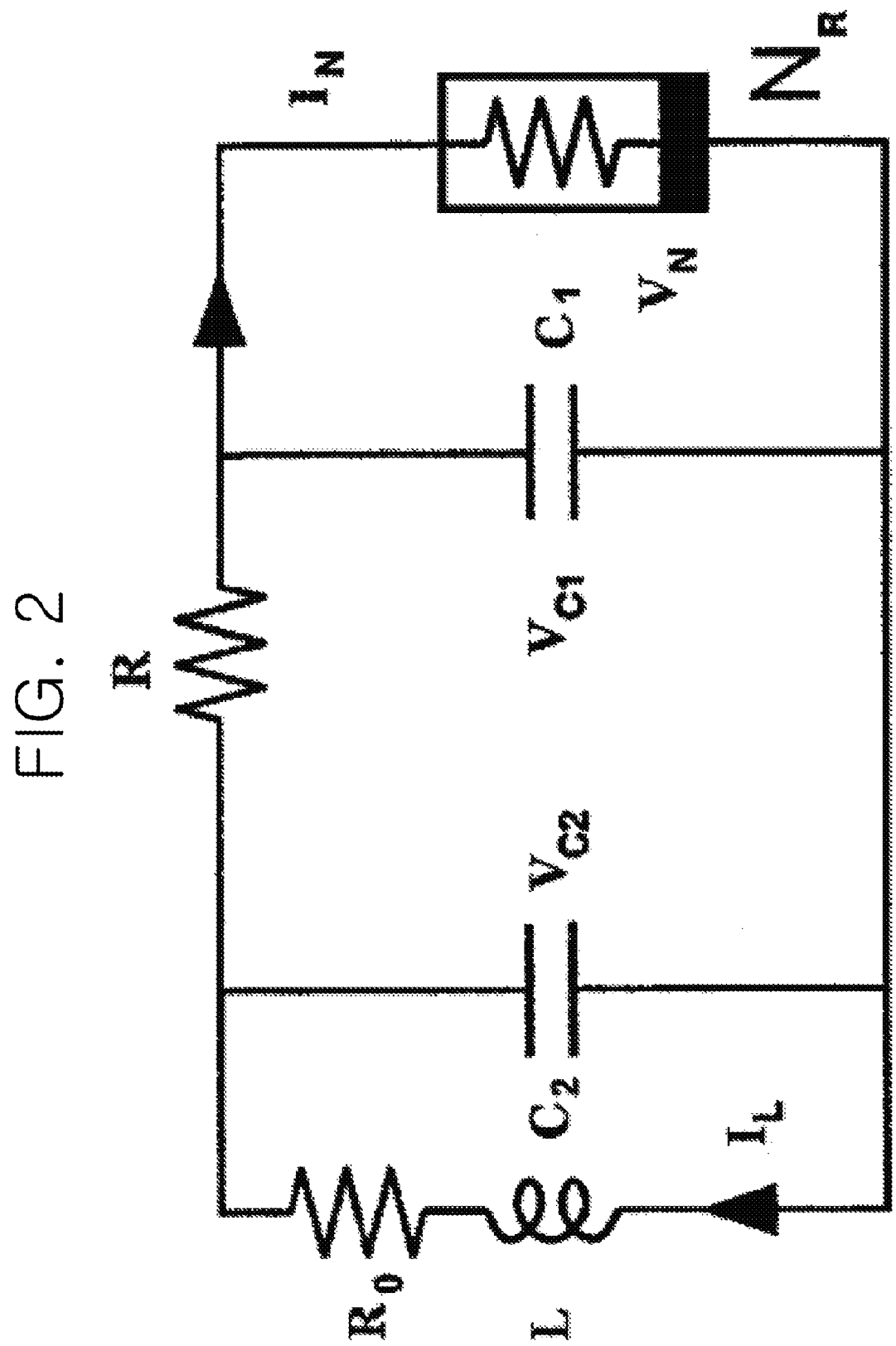
FIG. 2 shows a circuit of chaotic signal generator in the form of Chua circuit.

Chua circuit (T. Matzumoto. A chaotic attractor from Chua circuit//IEEE Trans. Circuits and Syst. 1984, v. CAS-31, #12, p. 1055). Electric layout of the circuit is shown in FIG. 2. The dimensionless equations describing the circuit are as follows:

$$x' = \alpha(y - x - h(x)) \quad (3)$$
$$y' = x - y + z,$$
$$z' = -\beta y - yz$$

where α, β and γ are parameters. The non-linear element response of system (3) is assumed to be piecewise-linear.

$$h(x) = m_1 + 0.5(m_o - m_1)\{|x + 1| - |x - 1|\}. \quad (4)$$

In equation (4), $m_o$ and $m_1$ stand for the slopes of the normalized piecewise-linear function.

Figure 3:
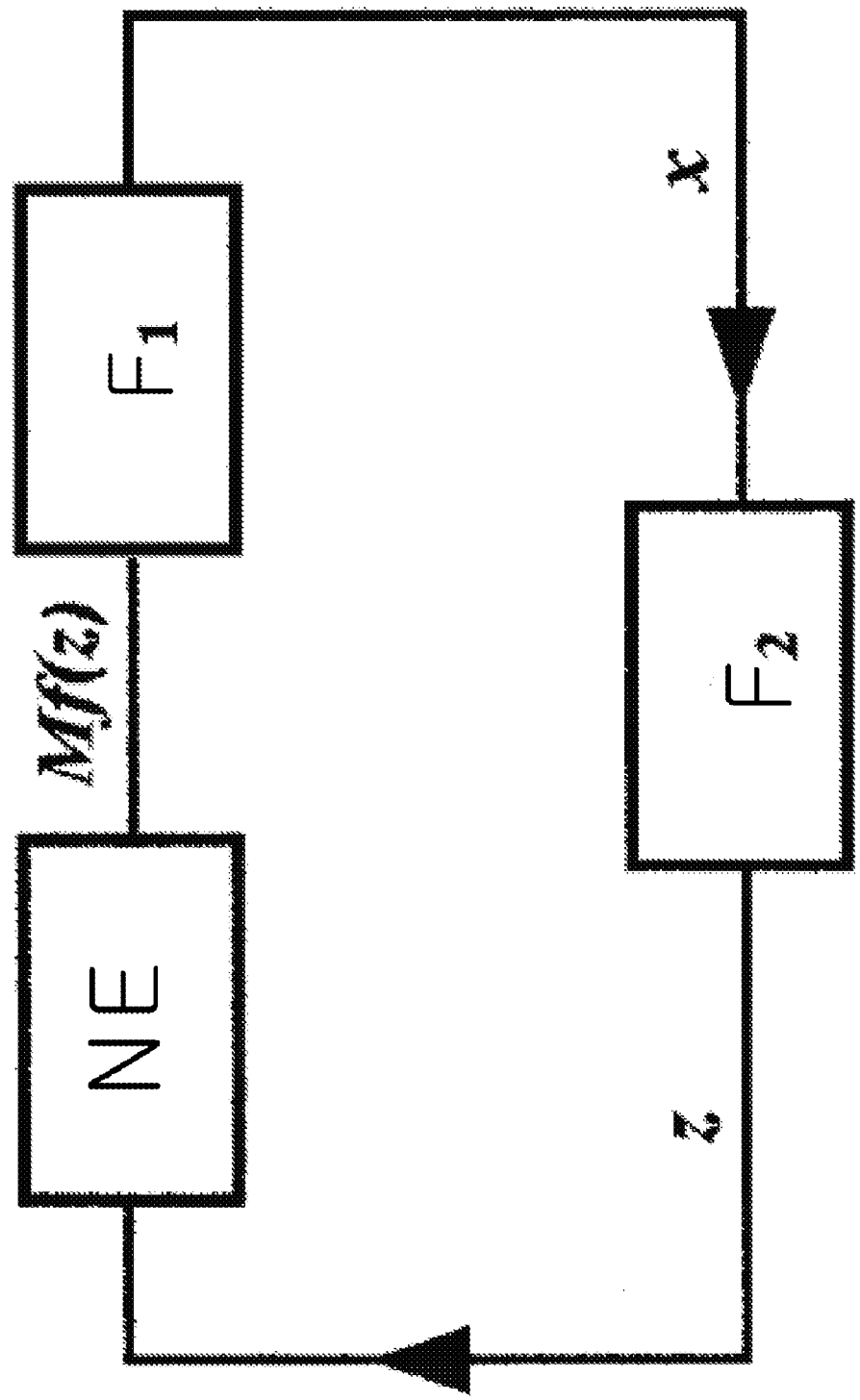
FIG. 3 shows a circuit of ring-structure chaotic signal generator with one and a half degrees of freedom.

Ring-structure oscillator (A. S. DMITRIEV, V. Ya. KISLOV. Stochastic oscillations in oscillator with inertial first-order time delay//Radiotekhnika i Elektronika, 1984, v. 29, #12, p. 2389). The oscillator model dimensionless equations are:

$$Tx' = -x + Mf(z) \quad (5)$$
$$y' = x - z$$
$$z' = -y - \alpha z$$

where T, M and α stand for parameters, and f(z) is a non-linear element response. Block diagram of such an oscillator is shown in FIG. 3, where NE denotes the non-linear element, and $F_1$ and $F_2$ denote low-pass filters of the first and second order, respectively.

Trajectories of chaotic systems are very sensitive to initial conditions. At the same time, oscillation modes of chaotic sources demonstrate variety of behavior with changes of the system parameters. If the number of essential system parameters increases, this normally results in a growing variety of dynamic modes. Chua system is a typical example. Variety of chaotic modes may also increase with increasing dimension of the dynamic system.

A large number of various oscillation modes with various spectral characteristics within the same system means that the modes change with a small change of the system parameters. This feature allows one to control chaotic systems at the power levels much lower than the power of a chaotic signal itself, which no doubt is useful for sufficiently powerful chaotic sources. The same feature under equal other conditions can provide a higher rate of chaotic oscillation modulation in comparison to modulation rate in classic systems. In general, due to the possibility of controlling chaotic modes by means of minor changes in the system parameters, one may expect an improved power efficiency of communication systems with chaos in comparison to traditional systems.

By their nature, the chaotic signals possess continuous spectrum that spreads over a wide frequency band. Conventional modulation methods are capable, in principle, to provide the transmitted signal bandwidth of up to 10-20% relative to the carrier frequency. However, this is obtained by means of rather complicated engineering solutions. As to chaotic signals, they are wideband by nature. Potentially, this enables one to modulate a chaotic carrier with a wideband information signal retaining the spectral properties of the chaotic carrier practically intact. Thus, this gives a possibility to rather simply implement not only wideband but also super wide-band communication systems.

Communications using chaotic signals with the method under the present invention may be implemented with the help of a communication system, whose block diagram is shown in FIG. 4a. According to this system, information signal 1 of transmitting side is fed to generator of chaotic RF or optical pulses 2 that in this particular case is a modulator of a wide-band carrier of information generated by chaotic dynamic system 3. The modulated signal is sent via communication channel 4 to receiving side to be processed by dynamic system 5, which results in retrieval of information signal 6. FIG. 4b shows the signal waveforms in various points of the circuit in FIG. 4a.

With the method under the present invention information is transmitted by means of signals in the form of chaotic RF pulses or chaotic optical pulses. In this description, a chaotic radio pulse refers to a pulse with chaotic filling, whose spectrum is in the area of radio or microwave frequencies, while a chaotic optical pulse refers to a pulse with chaotic filling, whose spectrum is at least in a part of frequency region occupied by infrared radiation, visible light and ultraviolet radiation. In this case, The term 'chaotic' is referred to a RF or optical pulse, whose duration is above the characteristic period of chaotic signal oscillations. Information transmitted by means of sequences of such pulses may be encoded with the pulse location in time domain, with the duration of the pulses, the distance between the pulses, etc.

Chaotic communications method under the present invention is based on three main ideas that make it practical: 1) chaotic source generates chaotic oscillations directly within a preset band of RF, microwave, infrared, optical, or ultraviolet band; 2) information signal is put in the chaotic signal by means of forming a corresponding sequence of chaotic RF or optical pulses; 3) information is retrieved with the use of a dynamic system matched in terms of its behavior with the chaotic system of the transmitting side.

Figure 5:
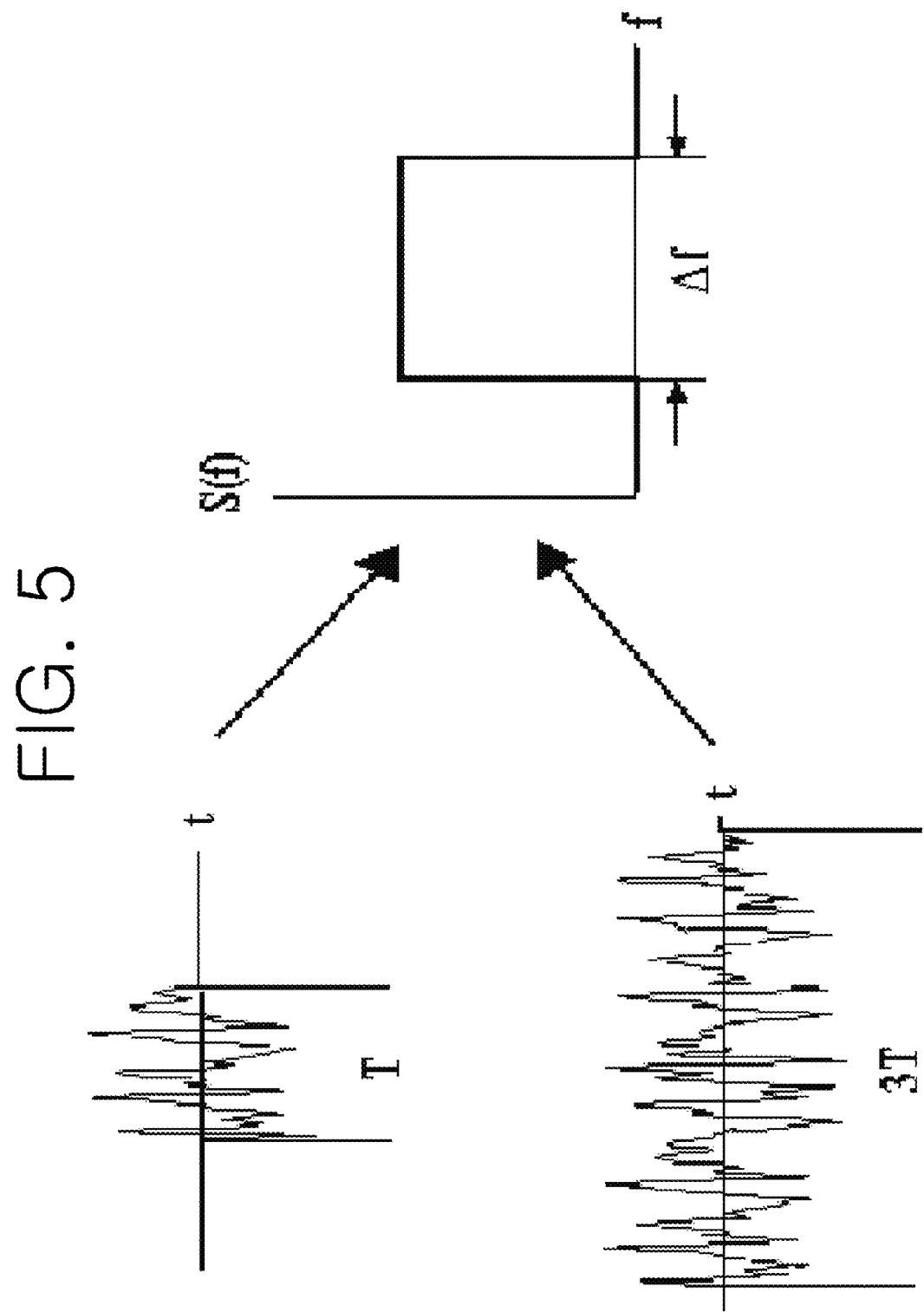
FIG. 5 shows the shape of a chaotic radio- or optical pulse.

As was stated above, chaotic RF or optical pulse is a fragment of a chaotic signal, the duration of which is above its characteristic period. The frequency bandwidth of the chaotic RF or optical pulse is determined by the frequency bandwidth of the original chaotic signal generated by chaotic source, and in a wide range is independent of the pulse duration (FIG. 5). This makes a chaotic radio or optical pulse essentially different from classic radio pulse filled with a fragment of a periodic carrier, whose frequency band Δf is determined by its length T:

$$\Delta f = 1/T \quad (6)$$

The capability of retaining pulse bandwidth with the changes of its duration enables to implement flexible schemes for modulating pulse sequence with fixed frequency parameters of transmitter output circuits and receiver input circuits. For example, a change in pulse duration does not require to change the band of the input filter and low-noise amplifier.

An increase of the duration of chaotic RF or optical pulse makes transmitting circuit more robust against interference. In this case, the pulse energy increases, which may be used to control the communication range without altering the peak transmitter power.

To implement the method of information transmission with chaotic signals under the present invention, to transmit a single data bit, a direct chaotic communication circuit may use single pulses as well as pulse sequences. In any of these two cases, a sequence of chaotic radio- or optical pulses is formed in time domain.

The duration of a chaotic RF or optical pulses and the repetition rate are variable. This enables one to flexibly control the data transmission rate by means of changing the repetition rate and the average signal power.

Due to the above properties of chaotic RF or optical pulse, these manipulations do not result in an essential change of the spectrum characteristics of the transmitted signal relative to the signal of the chaotic source. The transmitted signal reveals no additional spectral components.

In the method of information transmission using chaotic signals under the present invention, information stream may be formed by means of altering the distance between the pulses, the pulse duration, the root-mean-square amplitude of the pulses, a combination of these parameters, etc. For example, the duration of generated radio- or optical pulses can be varied from T~1/Δf to T→∞, where Δf stands for frequency bandwidth of the signal generated by the chaotic source.

Figure 6:
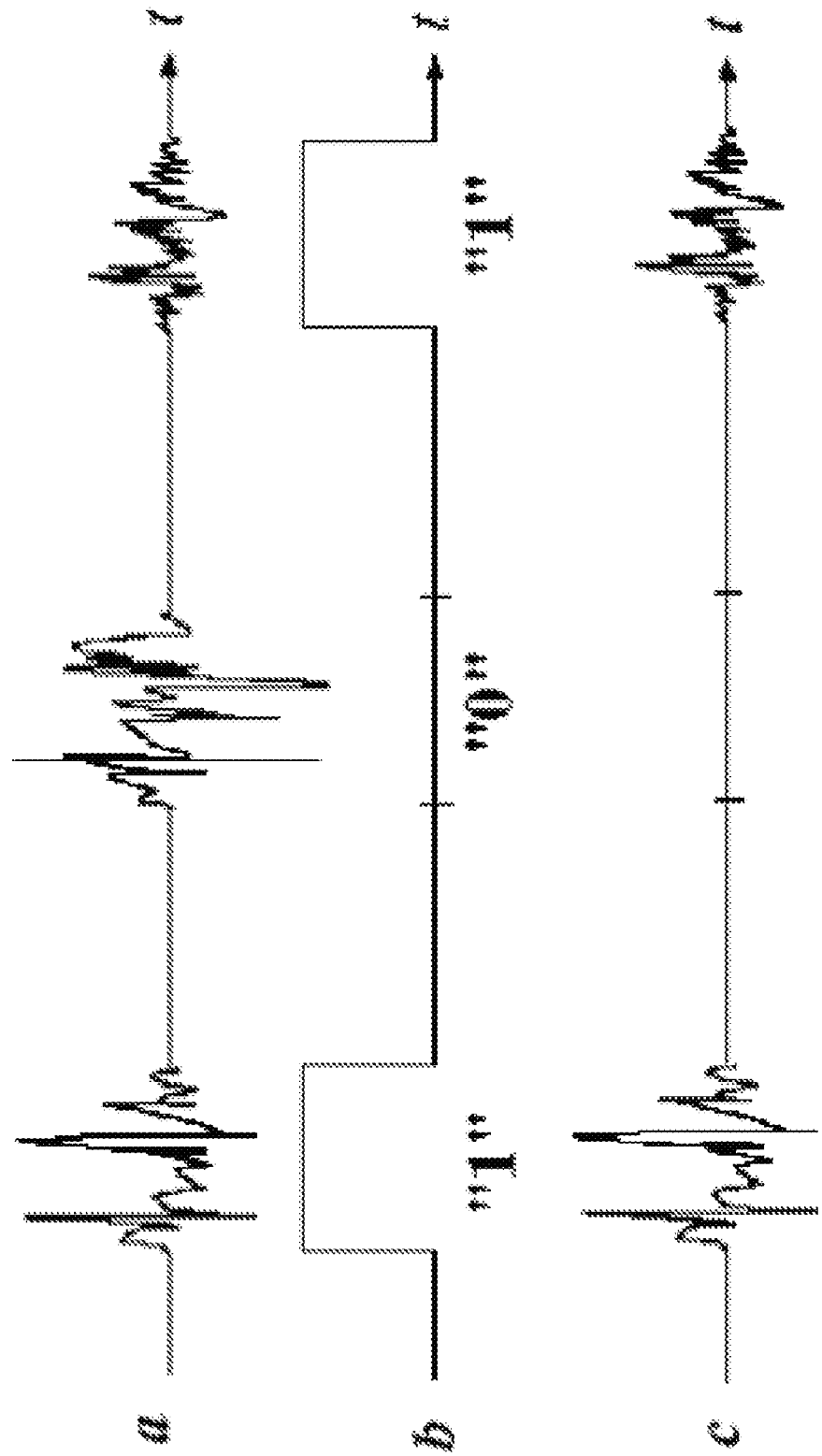
FIG. 6 shows the shape of chaotic pulses as they are formed judging from the information binary signal.

A sequence of RF or optical pulses may be formed with a fixed pulse repetition rate and with a fixed duration of pulses. In this case, the presence of a pulse on a given position in the sequence corresponds to transmitted symbol 1, while its absence to symbol 0 (see FIG. 6). In the receiver the pulses are identified, their parameters and location in the sequence are determined, and useful information is retrieved from the signal.

Figure 7A:
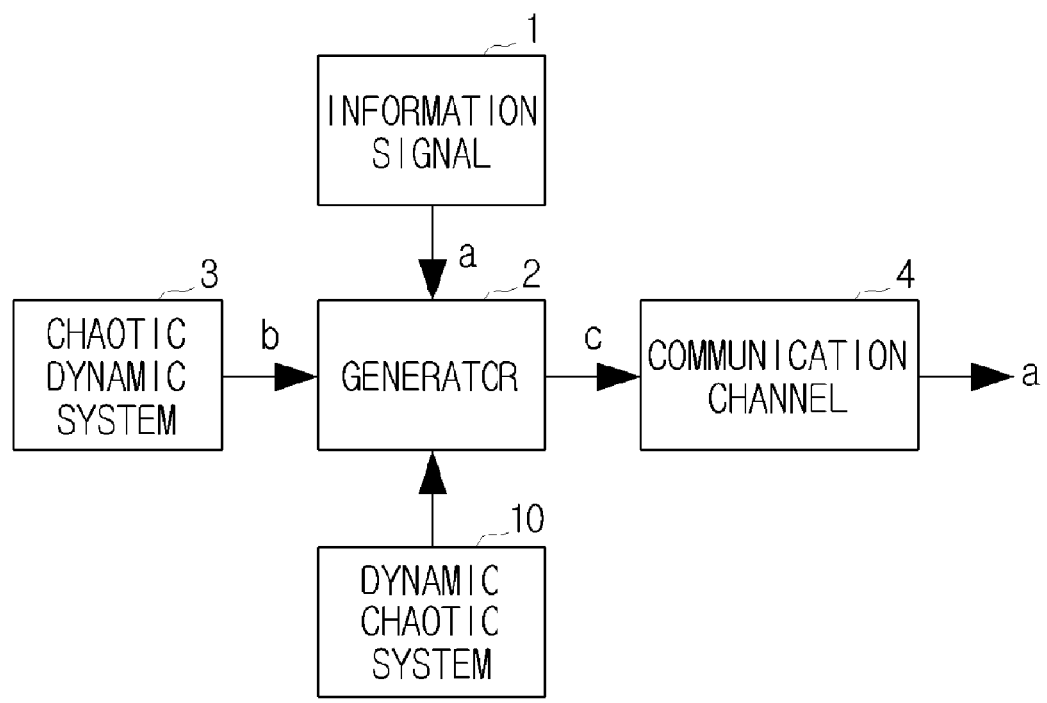

A sequence of RF or optical pulses may also be formed with a fixed duration of pulses and with chaotic intervals between the pulses $\Delta T_i$ determined by the dynamics of a supplementary dynamic chaotic system 10 (FIG. 7*a*) described by the equation $$\Delta T_{i+1} = F(\Delta T_i) \tag{7}$$

In this case, the presence of a chaotic radio- or optical pulse on a given position in the sequence corresponds to transmitted symbol 1, while its absence to symbol 0 (see FIG. 7*b*). At the receiving side with the use of a copy of a supplementary dynamic system 10 the expected time positions of chaotic radio or optical pulse arrival are determined, the presence or absence of the pulse on the expected position is fixed and useful information is extracted.

As is stated above, wide-band carrier is formed in a chaotic source represented by dynamic chaotic system 3 (FIG. 4A). The structure of this dynamic chaotic system 3 is synthesized beforehand according to preset characteristics of the wide-band information carrier. In the course of synthesizing such a chaotic dynamic system, the regions of its parameters related to uniform behavior of this chaotic dynamic system are identified, that are necessary for generation of a chaotic signal with minimum required spectral characteristics. This circumstance is denoted in FIG. 4A by block 7. On the basis of these identified regions in the said chaotic dynamic system, selected are its parameter values capable of generating a necessary wide-band information carrier in the form of a chaotic information carrier with the minimum required spectrum characteristics to ensure transmission of information with spectrum spreading. This fact is stated in FIG. 4A by means of block 8.

Apart from this, FIG. 4A shows a control component 9, by means of which the chaotic dynamic system 3 is regulated. In a particular case, this chaotic dynamic system may be implemented as a dynamic self-oscillating system to contain at least a single active component and an additional frequency-selective structure, parameters of which are controlled by means of the control component 9 shown in FIG. 4A.

Figure 8A:
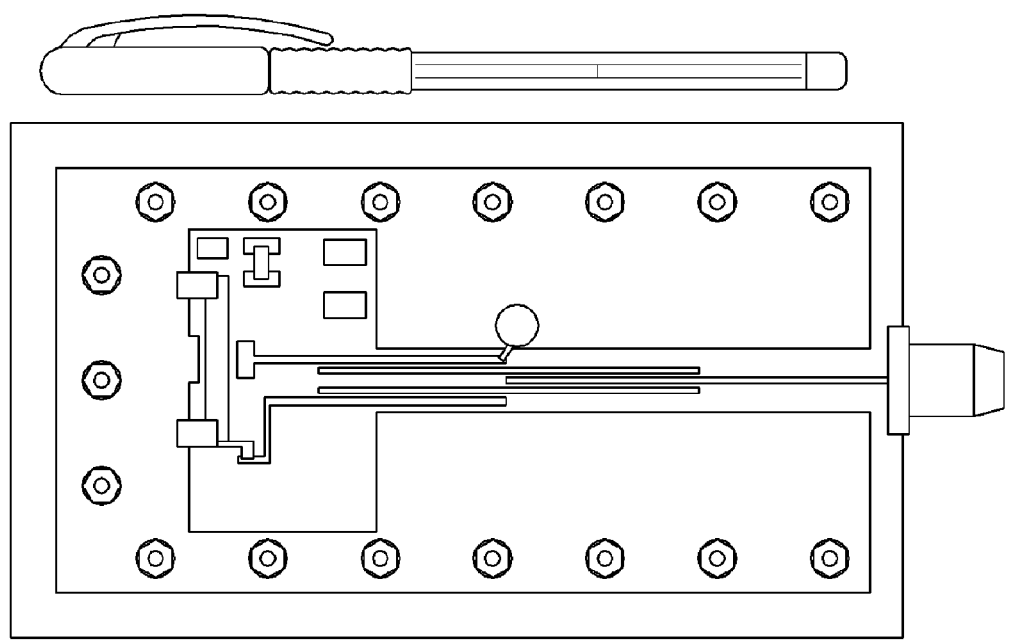
FIGS. 8A through 8C show the appearance and the layout of a potential dynamic oscillating system for implementing the method under the present invention, respectively.
Figure 8B:
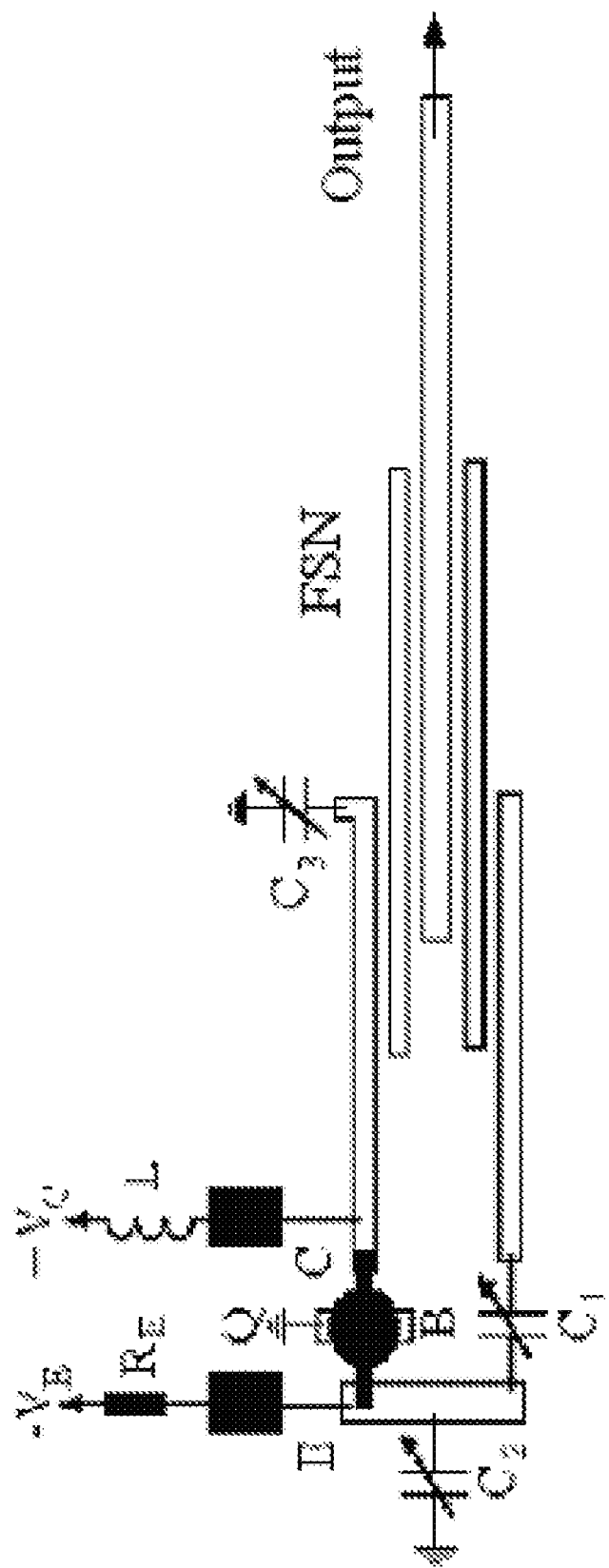
Figure 8C:
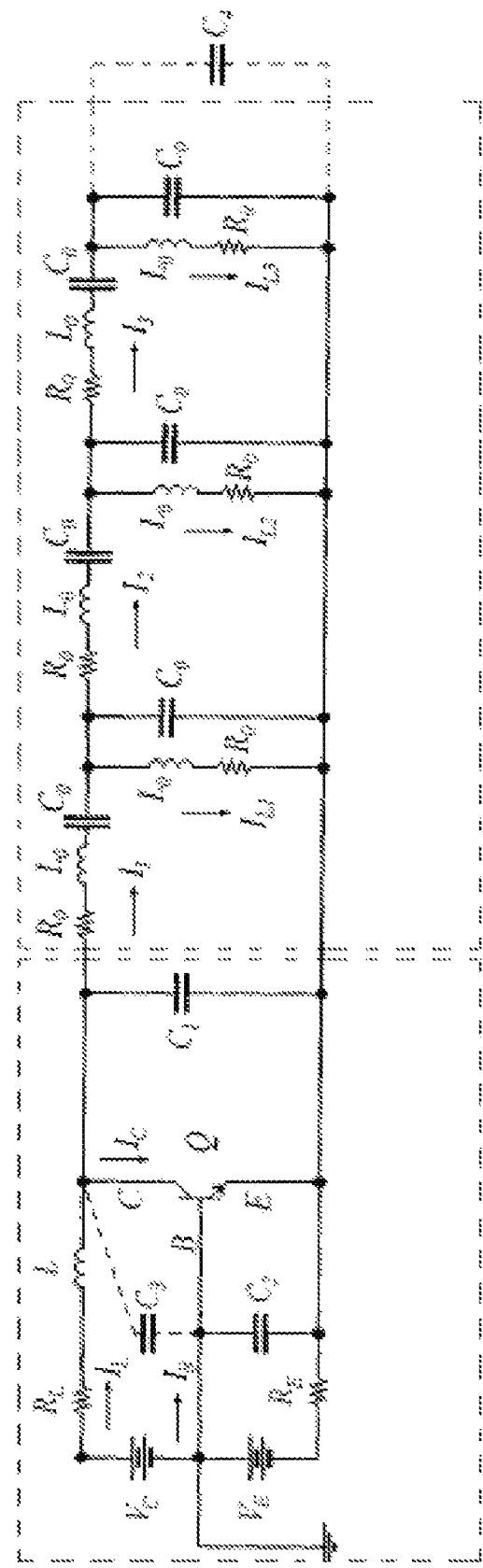

A specific design of a dynamic self-oscillating system 3 has been described for example in the aforementioned article (A. S. DMITRIEV, B. E. KYARGINSKI, N. A. MAKSIMOV, A. I. PANAS, S. O. STARKOV. Prospects of creating direct chaotic communication systems in radio and super high frequency bands//Radiotekhnika, 2000, #3, p. 9). Appearance of the system is shown in FIG. 8*a*. This dynamic self-oscillating system that generates chaotic oscillations in super high frequency band is designed (see FIG. 8*b*) according to three-point circuit on a single transistor, the collector-to-emitter space of which includes a resonance component (RC), functions of which are discharged by a bound strip line resonator. Characteristics of the latter are changed with the help of a reactive component that in the present case is represented by $C_3$ capacitor, while the circuit modes are tuned by means of variable capacitors $C_1$, $C_2$ and by altering voltages $V_E$ and $V_C$. An equivalent circuit of a chaotic dynamic system is shown in FIG. 8*c*.

Figure 9:
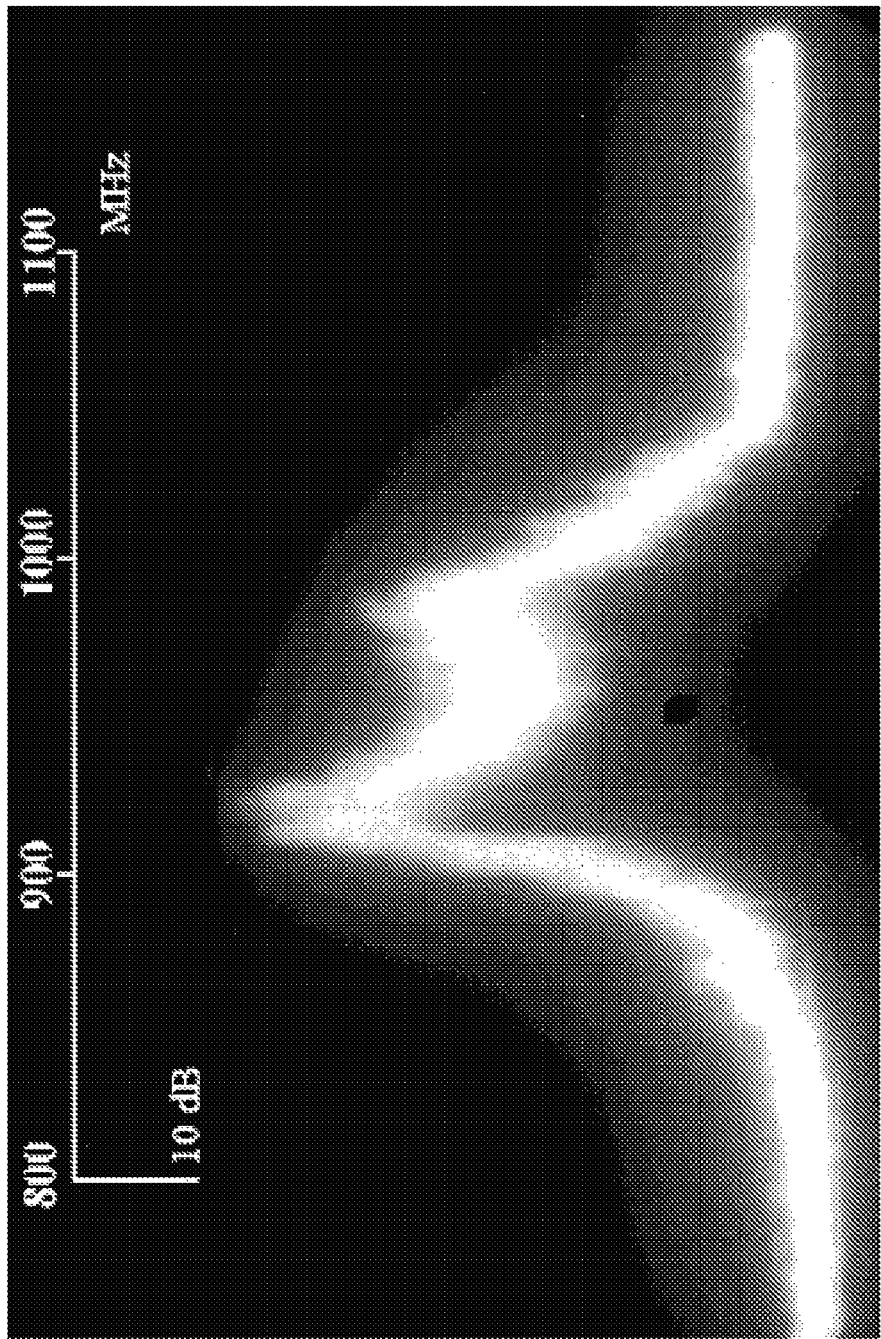
FIG. 9 shows a typical power spectrum of chaotic signals generated by the chaotic oscillating system in FIG. 8.

Generally speaking, classic single-transistor three-point circuits are intended for the generation of periodic signals. However, they may also generate chaotic oscillations both in low-frequency band and in radio- and super high frequency bands. A peculiarity of chaotic modes of such a generator consists in the wide-band nature of oscillations excited thereby: power spectrum of the oscillations extends both to the region of very low frequencies and to the region of high frequencies exceeding scores of time basic generation frequency $f_o$. For the purpose of obtaining a chaotic signal within frequency band Δf, circuit of such a generator has included the aforementioned resonance component (RC). Power spectrum of the generated chaotic signal is shown in FIG. 9. This principle of generating chaotic oscillations with a preset power spectrum has been offered and investigated in the following studies (Yu. L. BELSKI, A. S. DMITRIEV, A. I. PANAS, S. O. STARKOV. Synthesis of band-pass signals in self-oscillating systems//Radiotekhnika Elektronika, 1992, v. 37, #4 p. 660; A. S. DMITRIEV, A. I. PANAS and S. O. STARKOV. Ring oscillating systems and their application to the synthesis of chaos generating//International J. Bif and Chaos, 1996, v. 6, #5, p. 851).

Change of chaotic dynamic system 3 parameters with the help of control component 9 (resonance component RC in FIG. 8*b*) results in control of chaotic dynamic system 3 behavior. Another method used to control chaotic dynamic system 3 consists in control of representative point path in phase space of the said chaotic dynamic system 3 states (see for example A. L. FRADKOV, A. Yu. POGROMSKI. Introduction to control of oscillations and chaos//World Scientific Publishing, World Scientific Non-linear Science, Series A, v. 35, 1998).

Hence, the output of complete chaotic dynamic system 3 generates chaotic oscillations with a preset power spectrum that represent a wide-band information carrier. To transmit information with its help, it should be modulated in a certain way. Such a modulation of the wide-band information carrier with information to be transmitted may take place either subsequent to the generation of the wide-band carrier itself or in the course of this generation. In the first case, chaotic pulse generator 2 (FIG. 4) represents for example a key element that transforms chaotic oscillations of system 3 into chaotic radio- or optical pulses having a required duration and required intervals between these pulses. In the second case, generator 2 constitutes a part of chaotic dynamic system 3 that may be represented for instance by capacitors $C_1$ or $C_2$, a change in capacity of whom may result in exciting or failure of generation in the circuit (FIG. 8b).

A chaotic signal generated on transmitting side is transmitted to communication channel 4 (FIG. 4a).

Useful information on receiving side is extracted out of chaotic signals by integrating power of received pulses within their duration limits. I.e. in this case, a communication system that implements the method under the present invention performs non-coherent reception of chaotic radio- or optical signals sequence. This non-coherent reception represents demodulation of the received signal when a generated output signal is matched with envelope of a signal generated by chaotic dynamic system on receiving side.

Figure 10A:
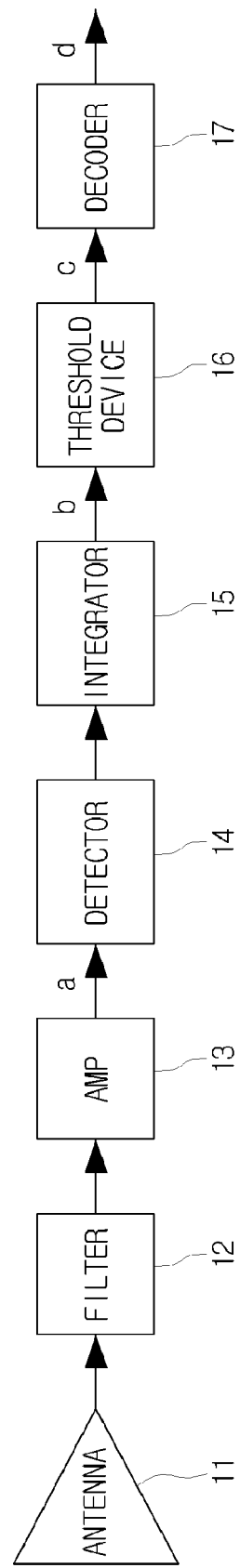

A possible circuit of the non-coherent reception is shown in FIG. 10a that illustrates the following components: 11—an antenna exposed to a flow of chaotic radio pulses; 12—a filter tuned to frequency band of transmitted chaotic signal; 13—an amplifier; 14—a detector, e.g. quadratic detector; 15—an integrator with integration time typical of a chaotic radio pulse duration; 16—a threshold device; 17—a decoder that correlates '1' with positions occupied by chaotic radio pulses, and '0' with positions free from radio pulses. FIG. 10b shows profiles of signals in various points of the circuit (FIG. 10a).

Figure 11:
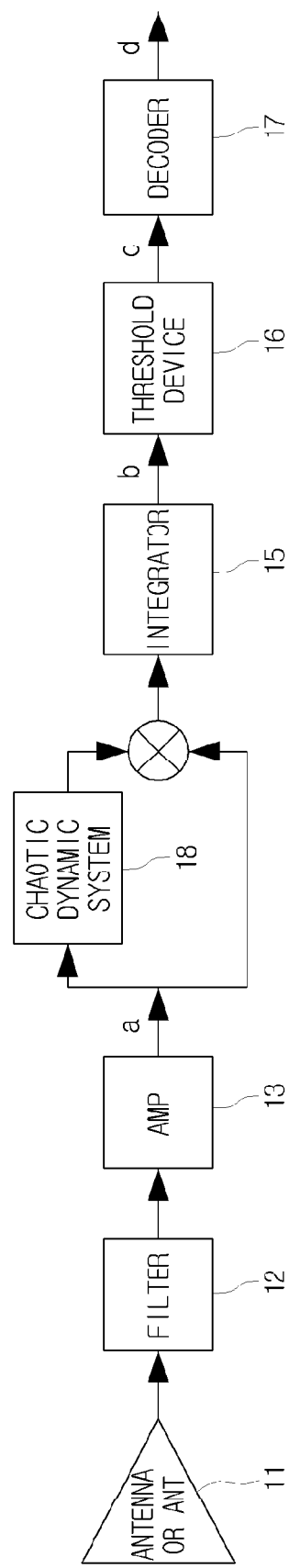
FIG. 11 shows a potential circuit for reception with chaotic dynamic system synchronization for the method under the present invention.

The offered communication system is also capable of making coherent reception. To do this, both reception and demodulation on receiving side are performed with the help of a chaotic dynamic system, behavior of which is at least partly synchronized with a chaotic signal of the chaotic dynamic system 3 of transmitting side. A potential circuit capable of implementing such a reception is shown in FIG. 11 that illustrates the following components: 11—an antenna exposed to a flow of chaotic radio pulses; 12—a filter tuned to frequency band of transmitted chaotic signal; 13—an amplifier; 18—a chaotic dynamic system similar to chaotic dynamic system on transmitting side; 15—an integrator with integration time typical of a chaotic radio pulse duration; 16—a threshold device; 17—a decoder that correlates '1' with positions occupied by chaotic radio pulses, and '0' with positions free from radio pulses.

Figure 12A:
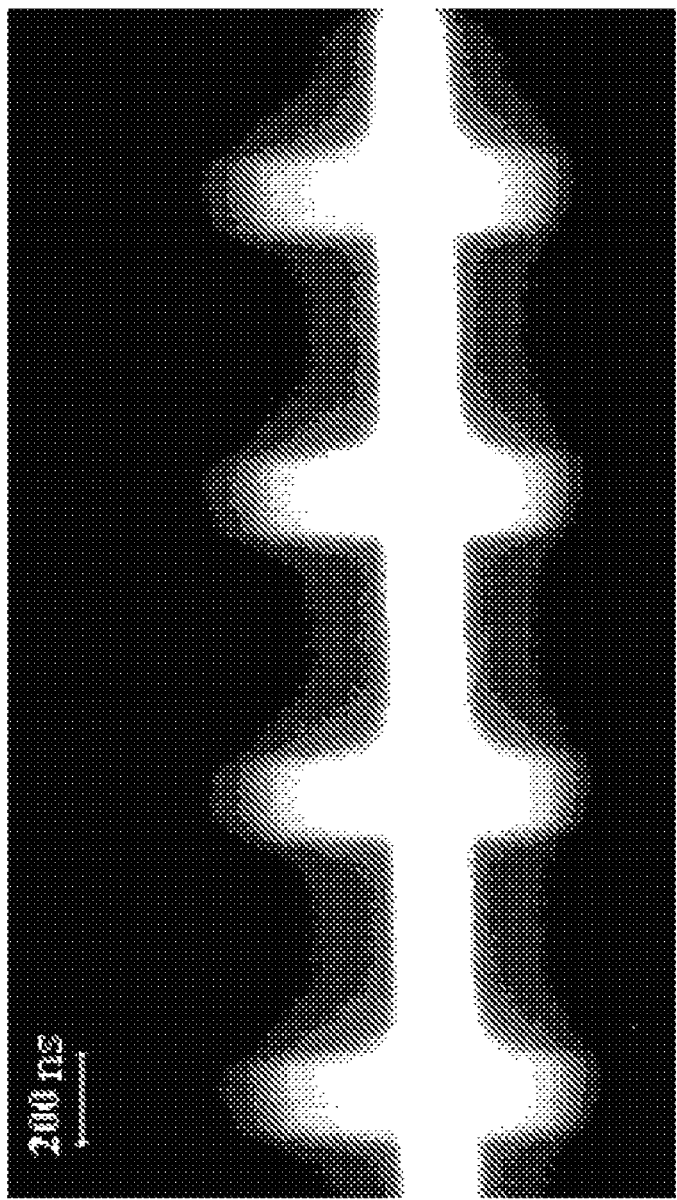
FIGS. 12A and 12B show oscillograms of chaotic radio pulses in a communication channel and their envelope retrieved on the reception side, respectively.
Figure 12B:
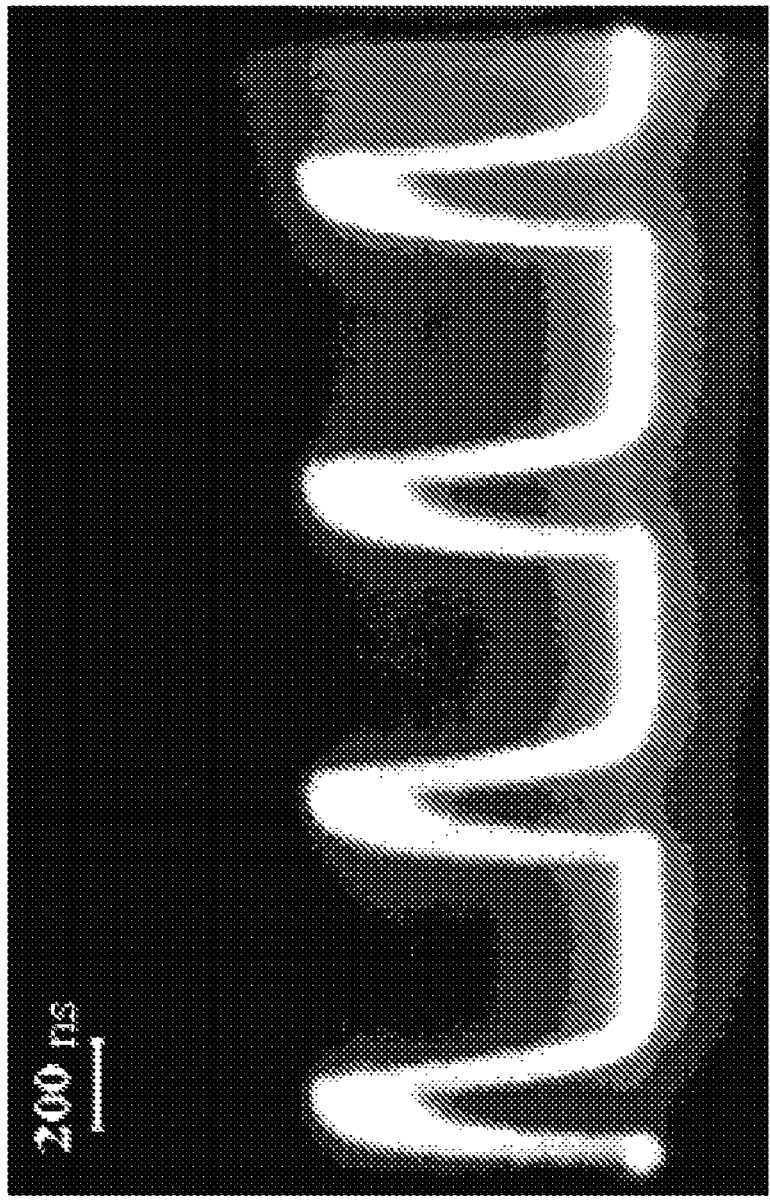

FIG. 12a exemplifies an oscillogram of chaotic radio pulses in communication channel that are generated with the help of a chaotic dynamic system shown in FIG. 8. FIG. 12b shows an envelope of chaotic radio pulses extracted by means of non-coherent reception (FIG. 10a).

Method of chaotic signal-aided transmission of information under the present invention may be applied in telecommunication technology to make information transmission faster and more immune against interference.

The present invention has been stated only for the purpose of illustration, but not in order to restrict the method applied for, scope of patent claims of which is determined in Formula of Invention subject to potential equivalents of features stated therein.

Chaotic dynamic system in the process of functioning generates a complicated nonperiodic motion or the so called dynamic (deterministic) chaos. In description of the behavior of dynamic systems a notion of the phase space is used, in which the system state is depicted by a point, and evolution of this state in time by a phase trajectory, along which the depicting point, moves. Systems with deterministic chaos have an attracting manifold in the phase space, where the phase trajectories gather in a single bunch. This attracting manifold is called a strange attractor. Signals formed by a chaotic dynamic system are called chaotic.

By their very nature, chaotic signals have continuous spectrum occupying a wide frequency range, which allows, when using them as an information carrier, to modulate such a chaotic information carrier by a wideband information signal, keeping the spectral characteristics of this chaotic carrier practically unchanged.

Figure 13A:
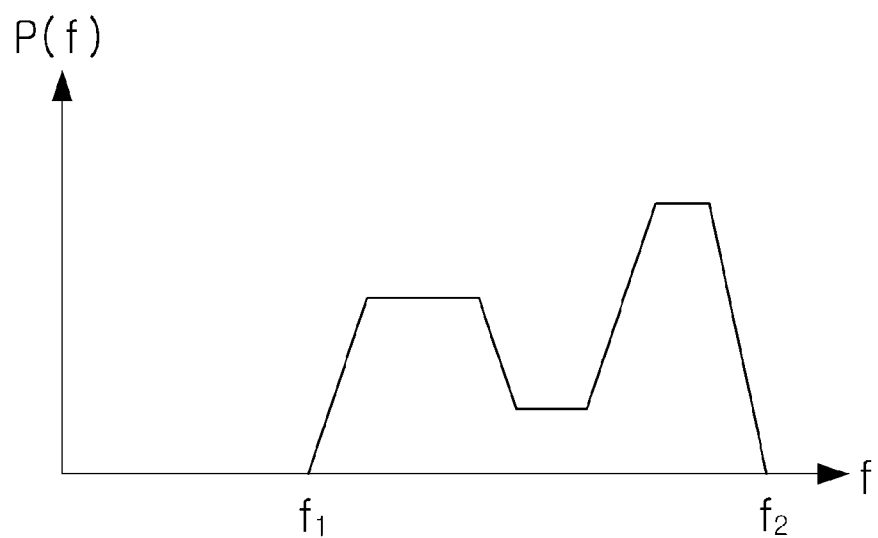
In FIGS. 13A and 13B illustrative examples of the form of the power spectral density envelope of chaotic information carrier, formed according to the present invention (using spectral mask), are presented.
Figure 13B:
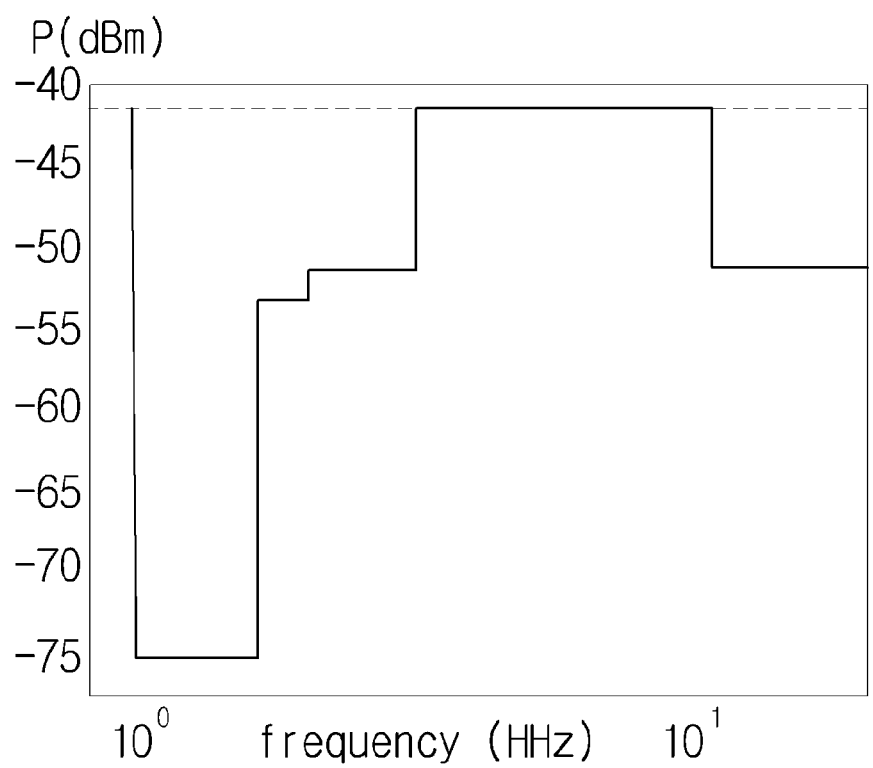

In accordance with the aim of the present invention, in forming a chaotic signal, one not only has to provide a required frequency range of the signal power transmitted through the channel, but to provide also the form of the envelope of the power spectral density in this part of the predetermined frequency range. This envelope form is defined by a so called spectral mask, exemplary embodiments of which are presented in FIGS. 13A and 13B. The spectral mask defines relation between the spectral density values of chaotic information carrier in different frequency subbands of the said specific part of the predetermined frequency range. In FIG. 13A an example of such a signal located in the frequency range ($f_1$, $f_2$) is presented. In FIG. 13B another example of the power spectrum of a signal with fixed spectral mask proposed for use in Wireless (office or) Personal Area (multiple-access) Networks (WPAN), recommended by FCC (FCC News from 14.02.2002).

Figure 14:
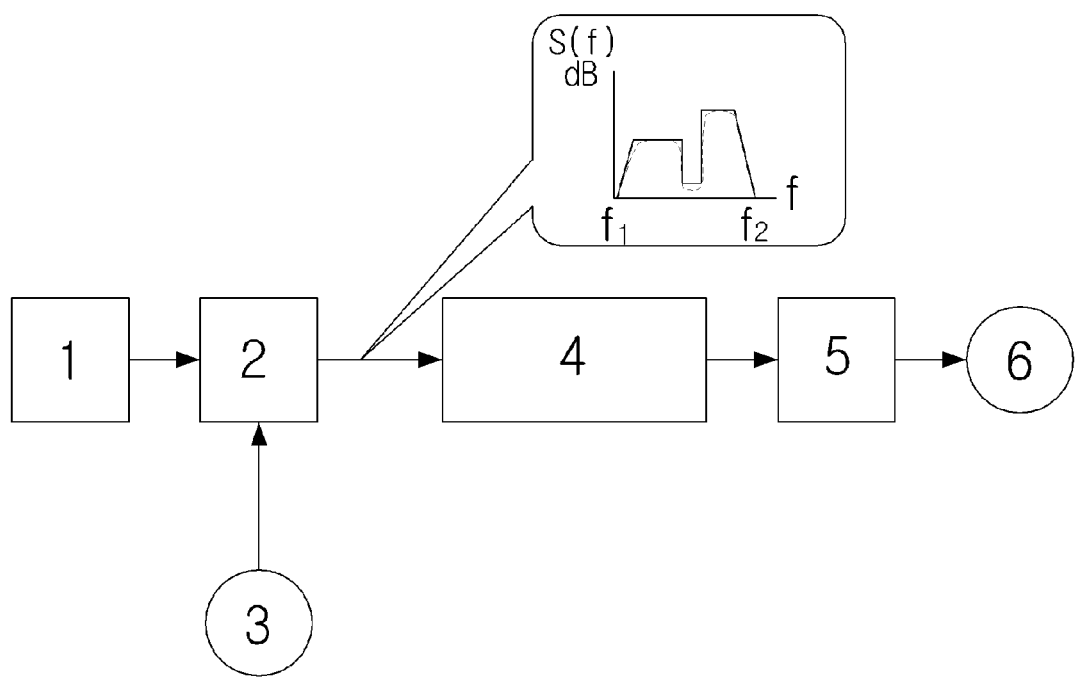
In FIG. 14 block diagram of a communication system is presented in which the method on the present invention can be implemented.

Method according to the present invention (in both its exemplary embodiments) can be implemented in a communication system whose block diagram is presented in FIG. 14. Chaotic dynamic system 1 at the transmitting side forms a chaotic information carrier at its output. In a modulator 2 this chaotic information carrier undergoes modulation by corresponding information signal 3. The modulated chaotic information carrier complying with the required spectral mask comes through a communication channel 4 to the receiving side that incorporates a chaotic dynamic system 5, matched in its behavior with the chaotic dynamic system 1 of the transmitting side, and forming at its output an estimate 6 of the original information signal 3.

The chaotic dynamic system 1 (and matched chaotic dynamic system 5) is synthesized according to predetermined characteristics of the required chaotic information carrier. These characteristics include not only a specific part (frequency range) of the predetermined frequency band (perhaps, the entire this band) as takes place in the mentioned patent of Russian Federation No. 2185032, but also the predetermined shape of the spectral density envelope in this part of the predetermined frequency band-spectral mask.

In order to solve this problem, in both exemplary embodiments of the present invention, as in the mentioned patent of Russian Federation No. 2185032, at the step of synthesizing the chaotic dynamic system those regions of its parameters are revealed that provide the same-type behavior of this chaotic dynamic system. Then, using the revealed parameter regions of this chaotic dynamic system those parameter values are taken that provide the step of forming the chaotic information carrier with required frequency ranges and required shape of the spectral density envelope.

Figure 15A:
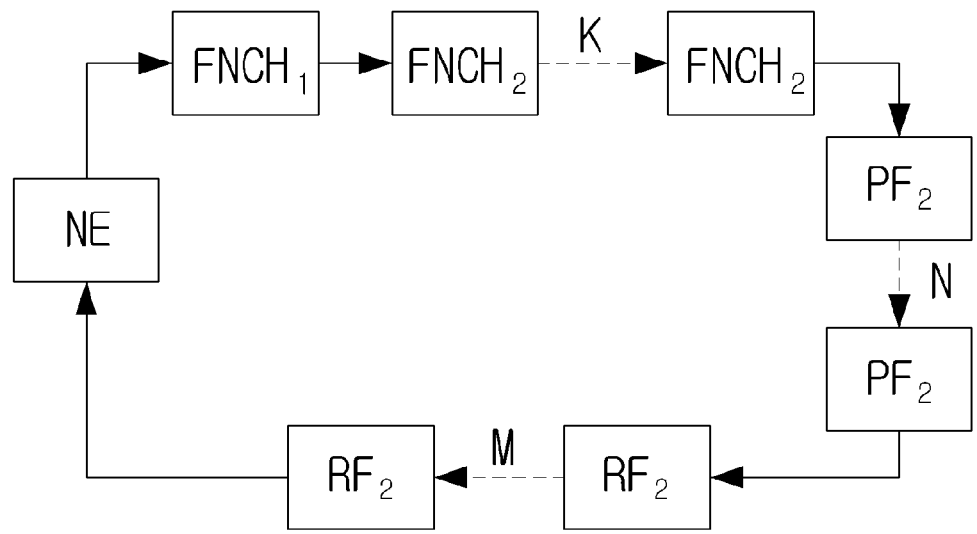
In FIGS. 15A and 15B show a block diagram of a ring-structure dynamic oscillation system is presented that forms required power spectrum of chaotic signal by means of adjusting corresponding amplitude-frequency and phase-frequency responses of frequency-selective element in the feedback loop.

This problem can be solved in the first exemplary embodiment of the method of the present invention using a chaotic dynamic system described in the mentioned patent of Russian Federation No. 2185032, if the frequency-selective element in the feedback loop of this system is taken such as it has corresponding amplitude-frequency and phase-frequency responses. A possible block diagram of such a dynamic system given in FIG. 15A incorporates a nonlinear element (NE) and a frequency-selective element based on a set of passive filters that participate in forming chaotic oscillations—K low-pass filters (LPF), N band-pass filters (BPF), M band-rejection filters (BRF) (Dmitriev A. S., Panas A. I., Starkov S. O., Ring oscillating systems and their application to the synthesis of chaos generator, Int. J. Bif. and Chaos, 1997, v. 7, N.

Figure 15B:
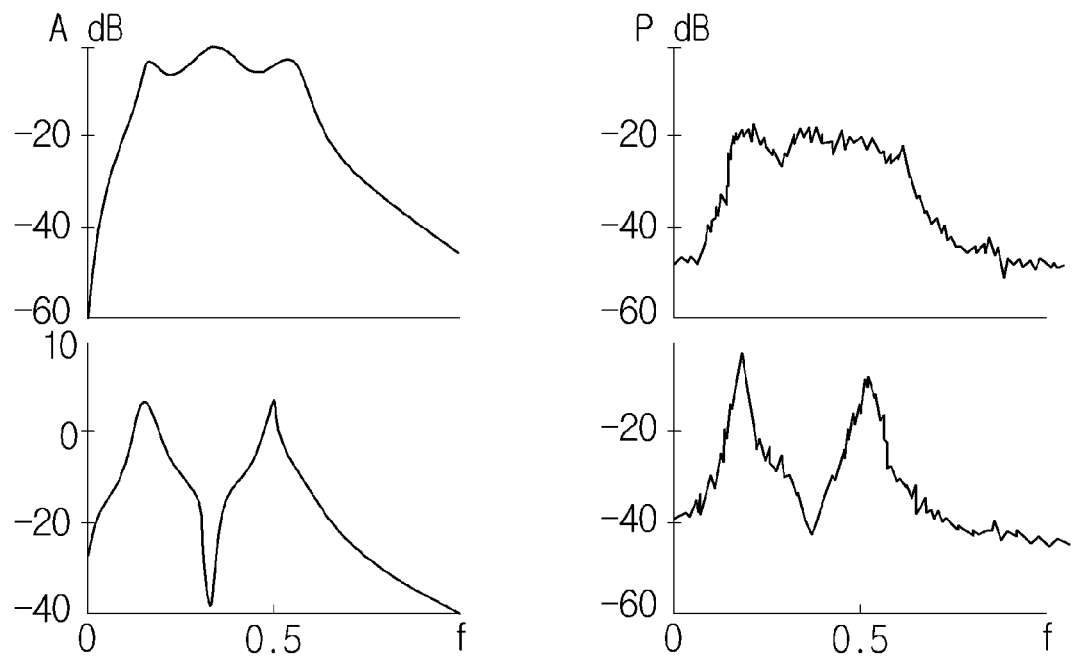

11, P. 2511-2527). In FIG. 15B (left) examples of amplitude-frequency responses of frequency-selective element and (right) the shapes of power spectrum of the formed chaotic signals are presented. Another solution is possible, if the output signal of chaotic dynamic system with more or less uniform spectral density is passed through a band-pass filter with corresponding amplitude-frequency response.

In this case, modulator 2 must be implemented in such a way that, when forming chaotic pulses in the process of modulation of chaotic information carrier at the output of chaotic dynamic system 1 by information signal 3, these chaotic pulses at the output of modulator 2 have such durations and intervals between them that do not change the shape of the spectral density envelope of chaotic information carrier (spectral mask). As is shown experimentally, chaotic pulses don't change substantially the frequency range of the original chaotic signal in a wide range of the pulse duration variation, they also preserve the shape of the power spectrum envelope-spectral mask. This is illustrated in FIG. 16, where the shape of the spectral mask (top), the spectrum and the chaotic signal waveform are presented, and in FIG. 17, where the waveform (top) of the signal transmitted to the channel for various durations of chaotic radio pulses and practically unchanged corresponding power spectra (bottom) are shown.

The step of receiving of such modulated chaotic information carrier can be performed either incoherently, or coherently using at the receiving side a chaotic dynamic system identical to the chaotic dynamic system of the transmitting side, generating a copy of the original chaotic signal used as the information carrier.

Figure 18:
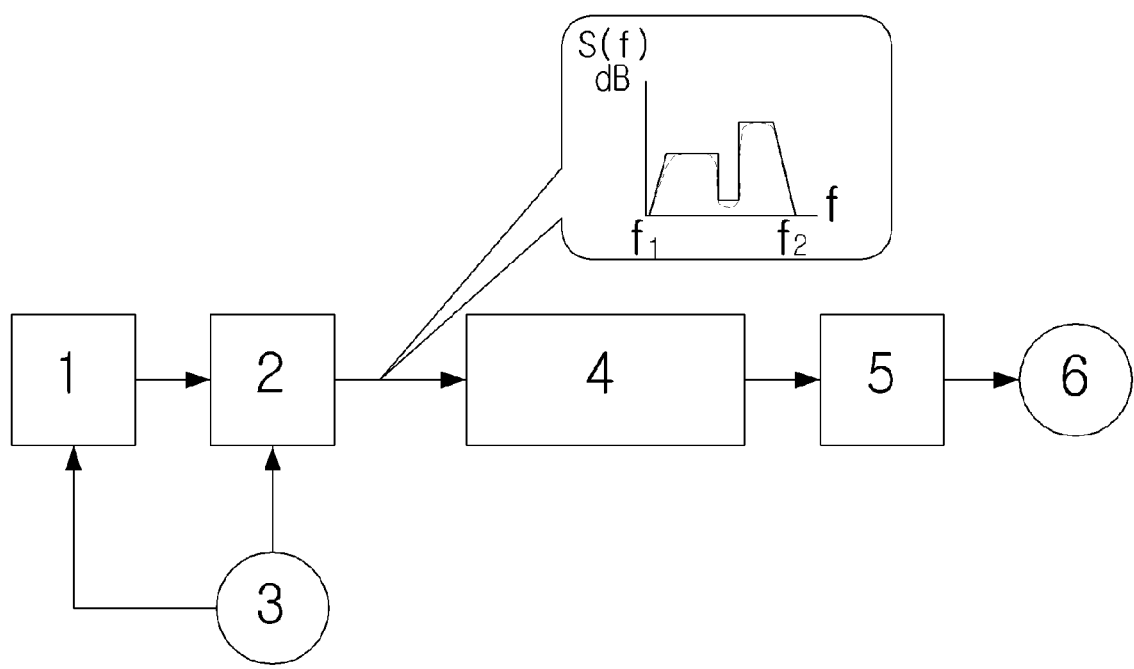
In FIG. 18 a generalized block diagram is presented in which the second exemplary embodiment of the method on the present invention can be implemented.
Figure 19:
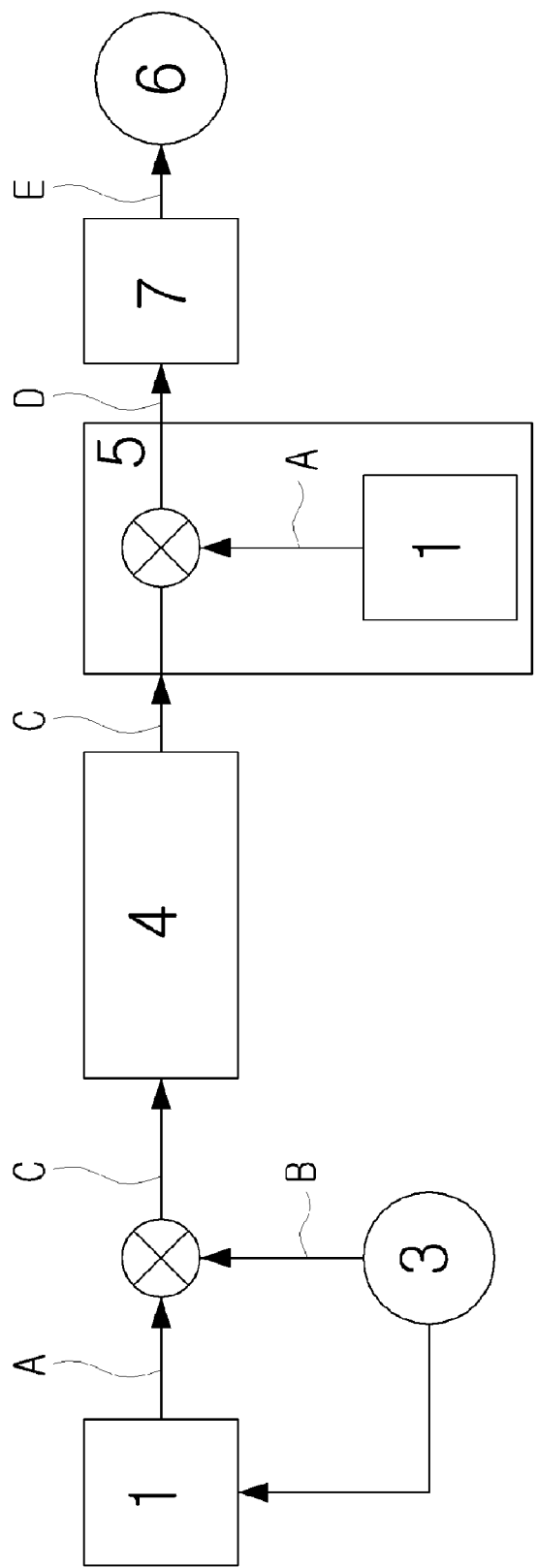
In FIG. 19 an example of forming a signal with predetermined spectral mask and retrieval of information signal at the receiving side according to the second exemplary embodiment of the present invention is shown.
Figure 20:
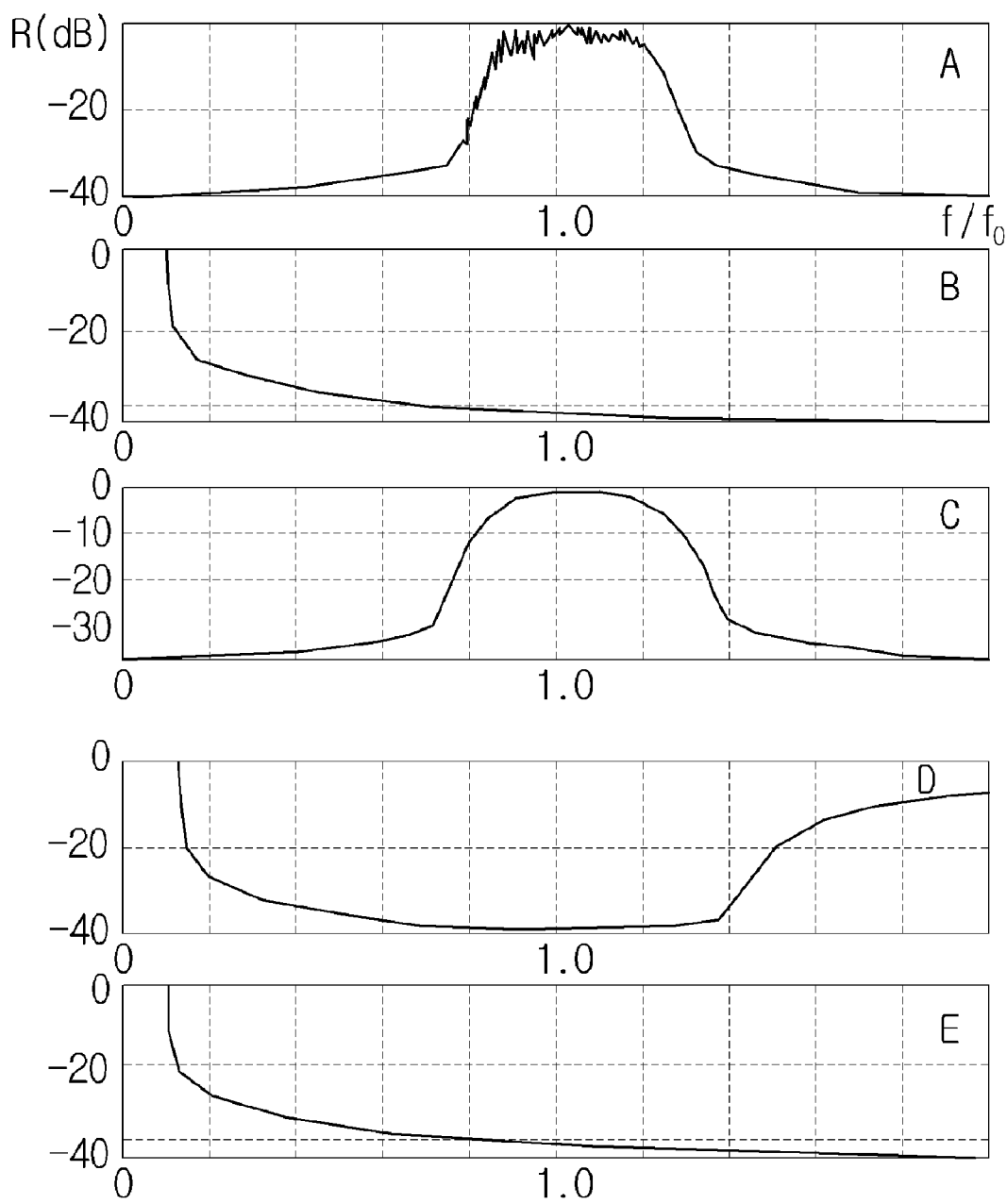
In FIG. 20 the form of power spectrum of the signal at various points of the system in FIG. 19.
Figure 21:
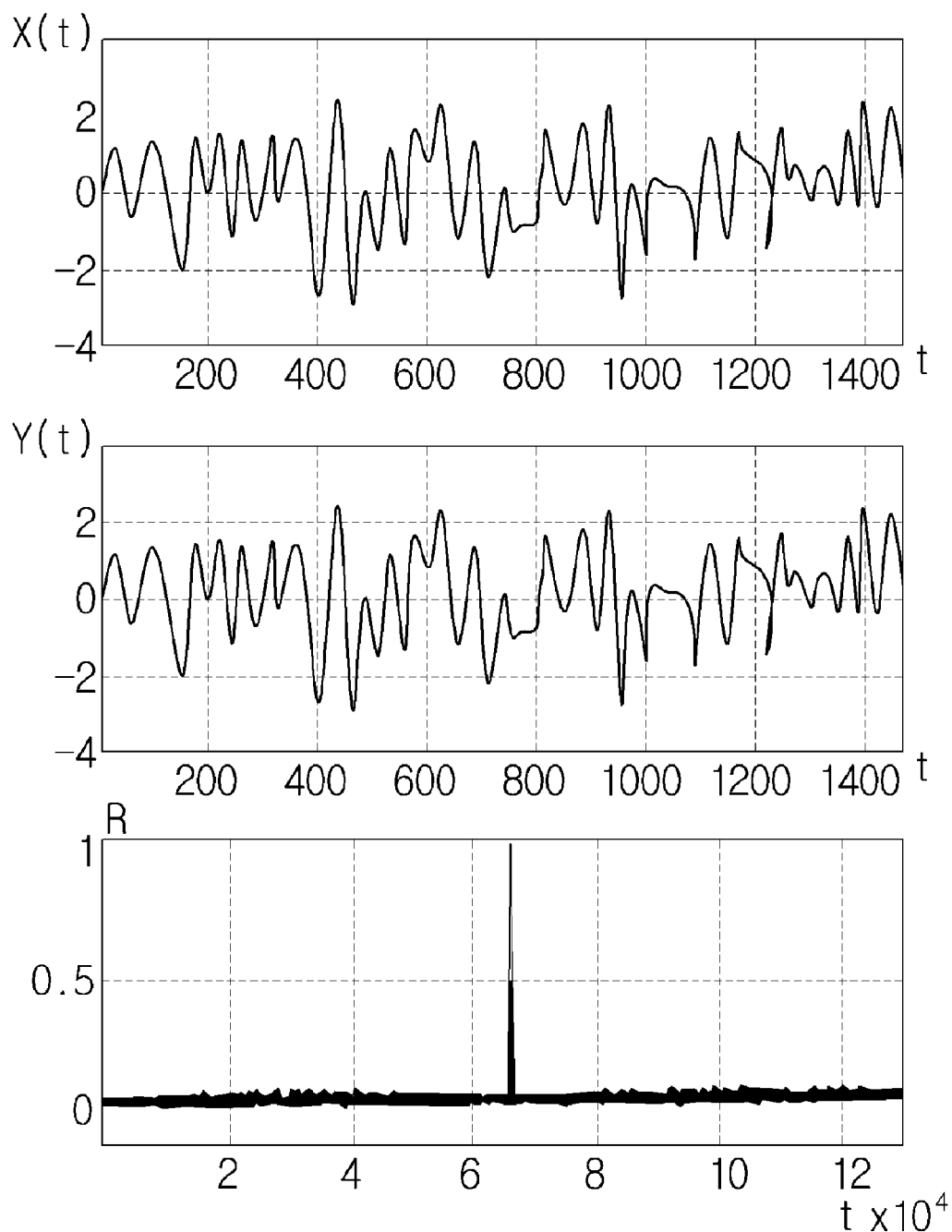
In FIG. 21 the form of the original information signal, its estimate at the receiving side obtained according to scheme in FIG. 6, and their mutual correlation function are shown.

In the second exemplary embodiment of the method of the present invention the required shape of the spectral density envelope of the chaotic information carrier modulated by information signal, defined by the spectral mask, is formed directly in the process of modulation of the chaotic information carrier by information signal 3 in the modulator 2 (FIG. 18). That is, the chaotic information carrier at the output of chaotic dynamic system 1 does not necessarily have the required shape of the spectral density envelope. An example of forming a chaotic signal with predetermined spectral mask according to the second exemplary embodiment of the present invention is given in FIG. 19. Taking into account the spectral mask of the signal at the output of modulator 2 and the frequency range of modulating information signal 3, at first, chaotic dynamic system 1 is synthesized so that the spectral density envelope of its output signal (chaotic information carrier) has such a shape that after multiplication by information signal 3 will be changed in the way that is required by the predetermined spectral mask. At the step of receiving such a signal at the receiving side the received signal must be multiplied by a copy of chaotic information carrier, which is provided by the same as system 1 behavior of a chaotic dynamic system. After such multiplication proper filtering 7 must be carried out and estimate 6 of the original transmitted information signal obtained at the output of the receiving side. The shape of the signal power spectrum at various points of system (a-e) is depicted in FIG. 20. The problem of the synthesis of chaotic dynamic system in this case can be solved in the same way as in the first exemplary embodiment of the present method, only for a different shape of amplitude-frequency and phase-frequency responses of said frequency-selective element. As follows from FIG. 21, the waveform of the original information signal X(t) and the signal Y(t) obtained at the receiving side practically coincide, which is confirmed by their mutual correlation function R(t).

Figure 22:
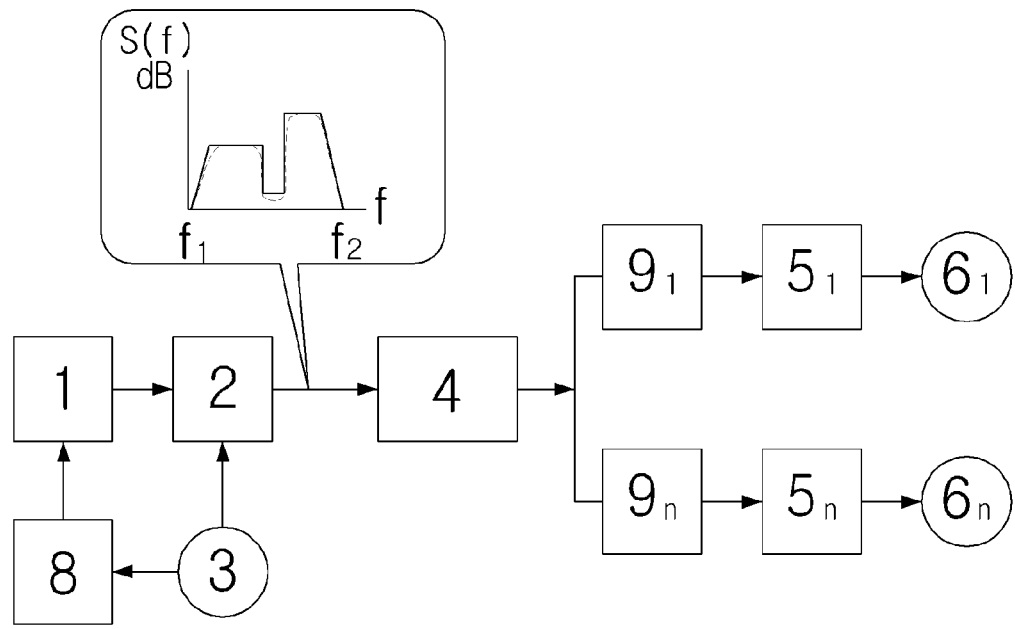
In FIG. 22 a generalized block diagram of a communication system according to the method of the present invention is presented, that allows organization of multiple access.

Since the method of the present invention is devoted to multiple access communications, it is necessary to provide identification of both the sender of a message and the recipient. For this purpose (FIG. 22), at the transmitting side tags are embedded into chaotic information carrier either before or after its modulation that allow to identify it as a signal of a specific user assigned to transmission to at least one other specific user 8. This embedding of identification tags can be implemented, e.g., by means of relating to each user (or each pair of users) a unique set of parameters of chaotic dynamic system 1. Then embedding of said identification tags occurs before modulation of chaotic information carrier by information signal 3 (or in the process of this modulation). Another way is to embed in each transmitted information fragment a special preamble (an identification premise) with the data on the recipient of the fragment. At the receiving side, at the step of receiving chaotic information carriers from communication channel 4 the chaotic information carrier devoted to this a specific user (units $9_1$-$9_n$ in FIG. 22) is retrieved using these identification tags. In the case when identification tags are embedded by means of choosing the parameters of chaotic dynamic system 1, the recipient is recognized (identified) by a chaotic dynamic system (nits $5_1$-$5_n$) matched with chaotic dynamic system 1 of the transmitting side. In the case of the use of preamble, the receiving user is identified by means of analysis of the preamble of each information packet received from communication channel 4. In this case, the preamble may also be set by a corresponding chaotic dynamic system. All these operations can be accomplished, e.g., with the means described in international application WO 00/74331 (H 04 L 27/00, Jul. 12, 2000).

Figure 23:
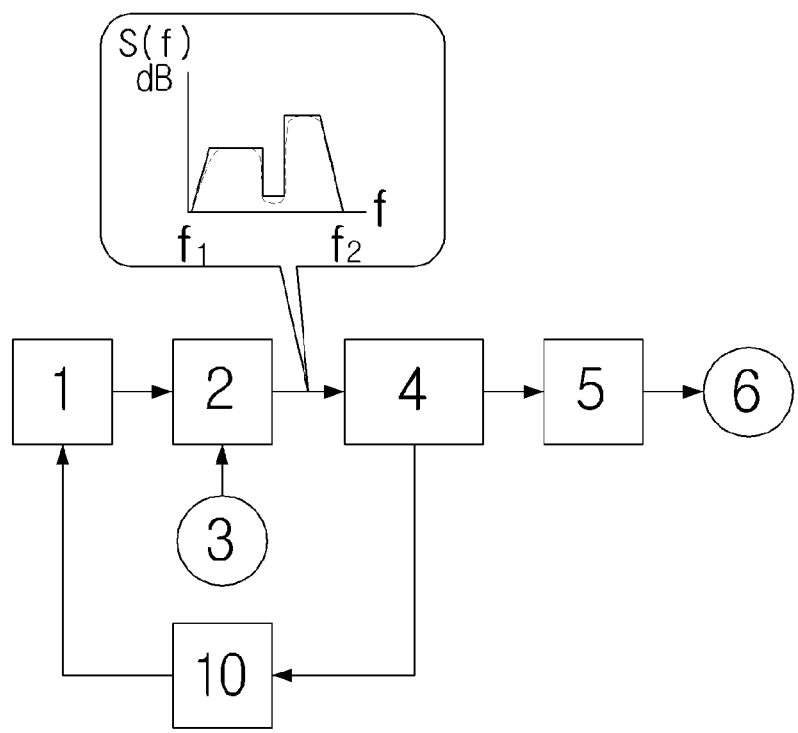
In FIG. 23 an example of a block diagram of a communications system according to the present method is presented, in which media access monitoring is implemented.

By using this invention as well as any other method for multiple access communications a problem appears of occupying a single communication channel by more than one transmitter. Therefore, in the method of this invention, access to the medium of chaotic information carrier propagation is monitored. One of the possible exemplary embodiments can be implemented as follows (FIG. 23). At the transmitting side of each user, the state of the medium is analyzed (unit 10) first, and whether the required frequency range of the communication channel defined by the spectral mask is unoccupied at the moment is determined. In the presence of a signal in the predetermined frequency range (channel occupied), the transmitting side is switched to waiting mode, i.e., chaotic signal generation is ceased until the frequency band used in this spectral mask is set free.

Figure 24A:
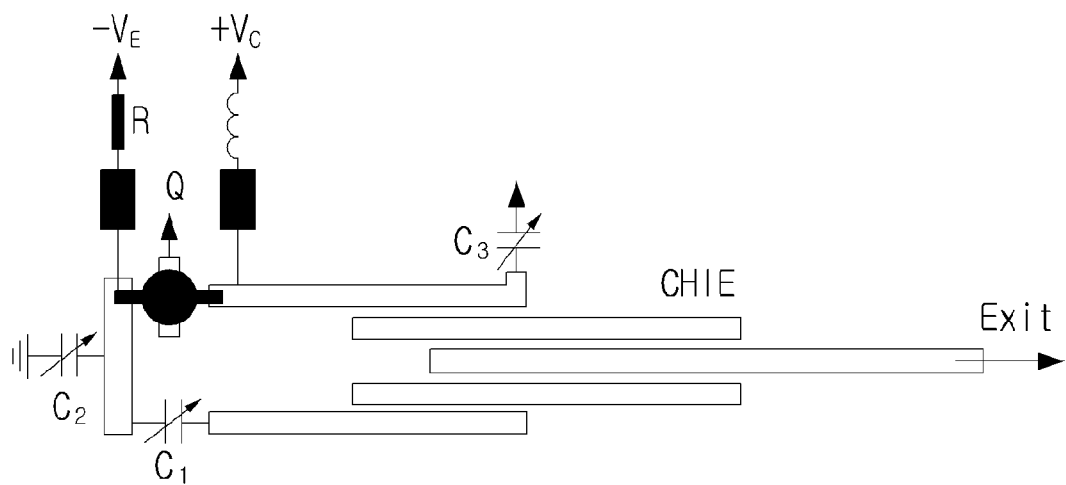
In FIGS. 24A and 24B show an exemplary embodiment of the topology of potential implementation of dynamic oscillation system using a single active element and the spectrum of chaotic signals generated by this system.
Figure 24B:
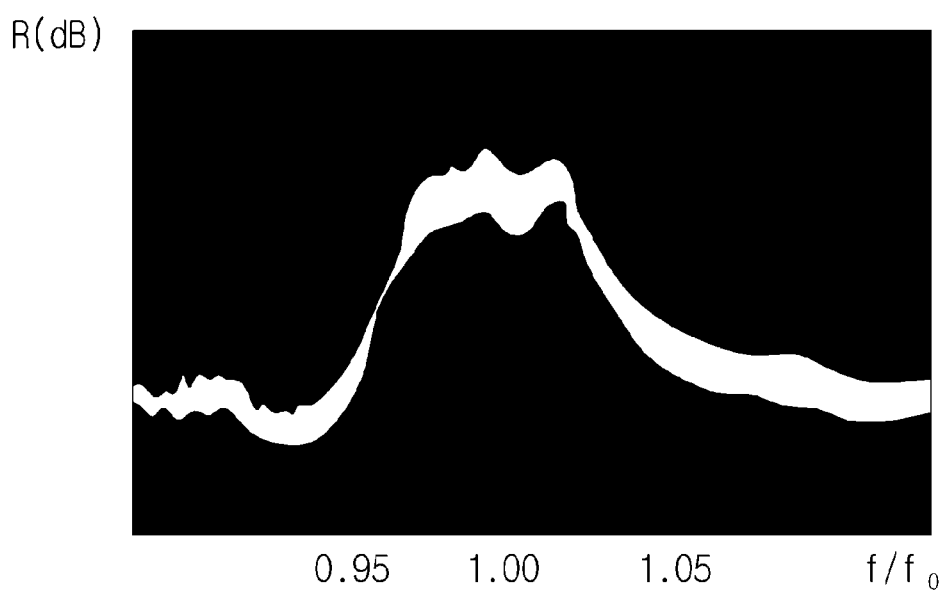
Figure 25A:
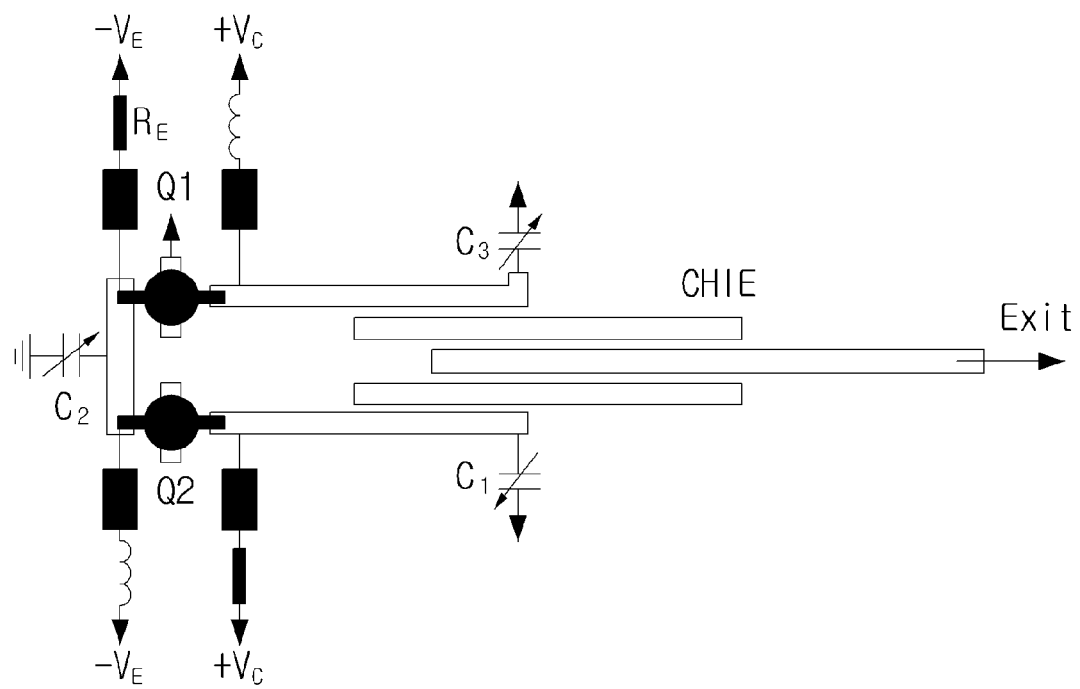
In FIGS. 25A and 25B show an exemplary embodiment of the topology of potential implementation of dynamic oscillation system using two active elements and the spectrum of chaotic signals generated by this system.
Figure 25B:
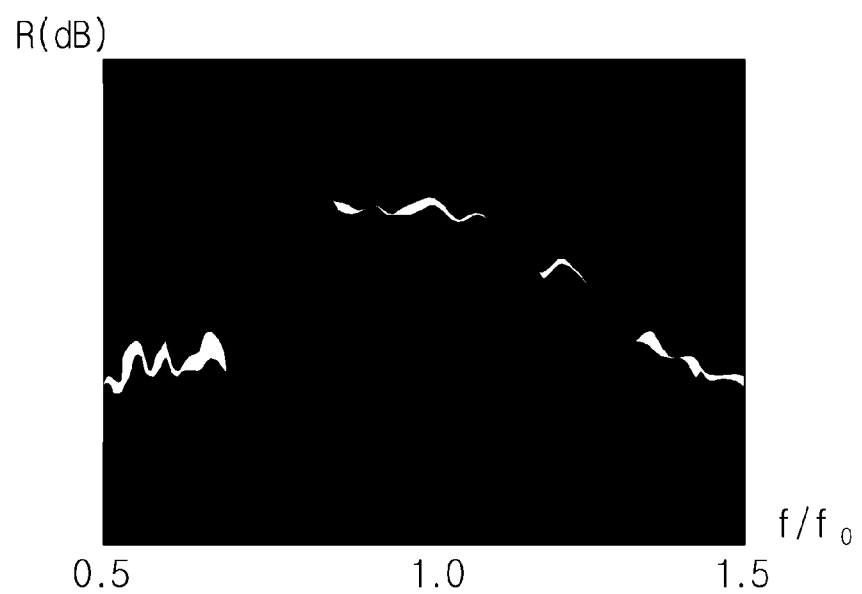

Note that a dynamic oscillation system with at least one active element and an additional frequency-selective structure can used as chaotic dynamic system 1 for forming chaotic information carrier with predetermined spectral mask in at least a part of the predetermined frequency range. In FIGS. 24-25 examples of possible exemplary embodiments of such a dynamic oscillation system are presented, based on one (FIGS. 24A and 24B) or two (FIGS. 25A and 25B) active elements, along with the spectra of corresponding chaotic signals. In FIG. 24A the microstrip topology of a chaotic oscillation system using a single active element, a bipolar transistor Q, loaded on a frequency-selective element (FSE) made of a microstrip filter, is shown. The power spectrum of generated signal is shown in FIG. 24B. In FIG. 25A the topology is presented for chaotic oscillation system with two active elements, transistors Q1 and Q2, loaded on frequency-selective microstrip structure. The power spectrum of generated signal is shown in FIG. 25B.

Figure 26:
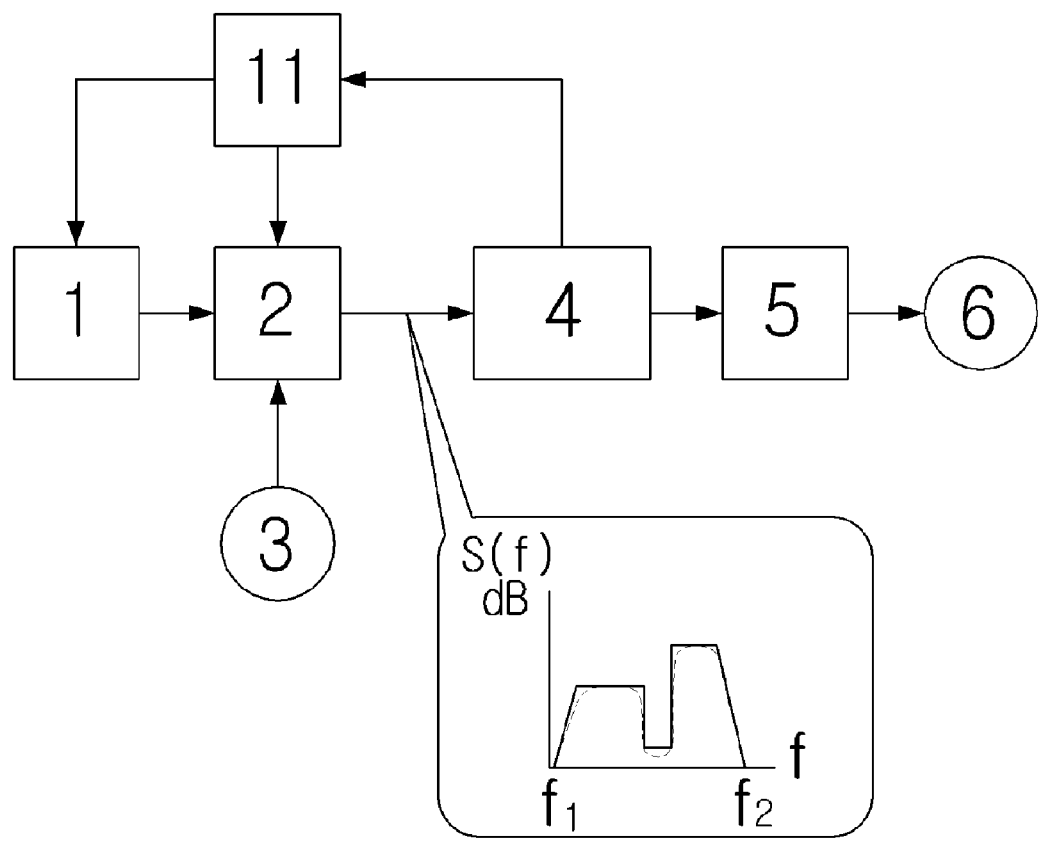
In FIG. 26 an example of a block diagram of a communications system according to the present method is presented, in which control of the signal base judging from the channel quality is implemented.

As is noted in the above-mentioned Patent of Russian Federation No. 2185032, an increase of the chaotic pulse duration increases the communication scheme resistance with respect to interference, since the increased pulse energy can be used to adjust the device operation range without changing the peak transmitter power. In this case, the pulse duration is set such as to provide predetermined signal base P, which is the number of independent freedom degrees (samples) of the signal, and is equal to $P=T \cdot \Delta F$, where T is the pulse duration and $\Delta F$ is the bandwidth of chaotic information carrier. Variable P is also called the signal processing gain. Increase of the pulse duration can be achieved with various means depending on the used schemes of chaotic dynamic system 1 and modulator 2 (FIG. 26). For example, if necessary, the duration of formed chaotic radio pulses can be varied directly (unit 11) in the modulator of the transmitting side. As follows from this drawing, changing the duration of chaotic radio pulses by a factor of two has practically no effect on the shape of spectral characteristics.

Method of direct chaotic communications with predetermined spectral mask according to any exemplary embodiment of the present invention can be applied in multiple access communication technique based on the use of ultrawideband signals, thus providing predetermined spectral density of the carrying signal power in different parts of the frequency range. In particular, method according to the present invention can be applied in a number of devices and systems, using the technique of frequency sharing of communication channels (e.g., standards IEEE 802.11, IEEE 802.15.3 and derivatives).

The present description is given only for the purpose of illustration, but not limitation of the proposed method, the scope of protection is defined by the applied Claims with regard of possible equivalents of the distinctive features presented.

What is claimed is:

1. A method of chaotic signal-aided transmission of information, comprising:
    generating by a transmitting side, a wide-band information carrier within a preset frequency band for information transmission;
    modulating the information carrier by means of an information signal;
    transmitting the modulated information carrier via a communication channel from the transmitting side to a receiving side;
    demodulating by the receiving side, the received information carrier to extract the information signal;
    the generating of the wide-band information carrier being performed with the help of a chaotic dynamic system, the structure of which is synthesized beforehand following preset characteristics of the above wide-band information carrier;
    in synthesizing the chaotic dynamic system, regions of its parameters being identified to ensure uniform behavior of the above chaotic dynamic system;
    on the basis of the identified regions of parameters, values of parameters being selected for the chaotic dynamic system to ensure generation of the wide-band information carrier in the form of a chaotic information carrier with minimum required spectrum characteristics;
    the modulation being performed by the generation in accordance with the information signal of chaotic radio- or optical pulses having a preset duration with preset time intervals between these pulses;
    transmitting the modulated information carrier via the communication channel; and
    the reception and demodulation on receiving side being performed with the help of a dynamic system matched in terms of its behavior with the aforementioned chaotic dynamic system on the transmitting side.

2. The method of claim 1, wherein the function of the aforementioned chaotic dynamic system is discharged by a dynamic self-oscillating system with at least a single active component and a supplementary frequency-selective structure for generating the above wide-band information carrier.

3. The method of claim 2, wherein the dynamic self-oscillating system is supplemented with control components for selecting a mode of generating the wide-band information carrier and/or generating the above chaotic radio- or optical pulses and intervals between them.

4. The method of claim 2, wherein the generation of radio- or optical pulses and intervals between them is performed in a supplementary feedback circuit of the aforementioned dynamic self-oscillating system.

5. The method of claim 1, wherein the generation of radio- or optical pulses with preset duration and time intervals between them is performed by controlling the above chaotic dynamic system behavior.

6. The method of claim 5, wherein the control of the chaotic dynamic system behavior is performed by controlling change of the chaotic dynamic system parameters.

7. The method of claim 5, wherein the control of the chaotic dynamic system behavior is performed by controlling a representative point path in phase space of states of the chaotic dynamic system.

8. The method of claim 7, wherein the control of the path is performed by changing initial conditions of the chaotic dynamic system actuation.

9. The method of claim 7, wherein the control of the path is performed by holding the representative point path in phase space of states of the chaotic dynamic system in a preset area of the phase state space during a preset period of time.

10. The method of claim 1, wherein the duration of the chaotic radio- or optical pulses and/or intervals between them are formed with the help of chaotic counts generated by a supplementary chaotic dynamic system and input information to be transmitted.

11. The method of claim 1, wherein the reception and demodulation on the receiving side are performed with the help of a chaotic dynamic system, behavior of which is at least partly synchronized with a chaotic signal of the chaotic dynamic system on the transmitting side.

12. The method of claim 1, wherein the aforementioned reception and demodulation on receiving side are performed with the help of a chaotic dynamic system, output signal of which is matched with an envelope of a signal of the chaotic dynamic system on the transmitting side.

* * * * *